(12) United States Patent
Taylor et al.

(10) Patent No.: US 9,748,743 B2
(45) Date of Patent: Aug. 29, 2017

(54) ELECTRICAL PANELBOARD ASSEMBLIES AND METHODS

(71) Applicant: Siemens Industry, Inc., Alpharetta, GA (US)

(72) Inventors: Michael Joseph Taylor, Duncanville, TX (US); Prashanti Koka, Grand Prairie, TX (US); Anthony P. Perini, Lawrenceville, GA (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 14 days.

(21) Appl. No.: 14/858,066

(22) Filed: Sep. 18, 2015

(65) Prior Publication Data

US 2016/0315453 A1 Oct. 27, 2016

Related U.S. Application Data

(60) Provisional application No. 62/151,754, filed on Apr. 23, 2015.

(51) Int. Cl.
*H02B 1/052* (2006.01)
*H02B 1/056* (2006.01)
*H02B 1/21* (2006.01)
*H02B 3/00* (2006.01)

(52) U.S. Cl.
CPC ............ *H02B 1/052* (2013.01); *H02B 1/056* (2013.01); *H02B 1/21* (2013.01); *H02B 3/00* (2013.01)

(58) Field of Classification Search
CPC .......... H02B 1/056; H02B 1/21; H02B 1/205; H02B 1/20; H02B 1/052; H02B 1/36; H02B 1/202; H02B 1/207; H02B 1/22; H02B 3/00
See application file for complete search history.

(56) References Cited

U.S. PATENT DOCUMENTS

| | | | |
|---|---|---|---|
| 3,767,977 A | 10/1973 | Bachman | |
| 4,167,769 A | 9/1979 | Luke et al. | |
| 4,667,268 A * | 5/1987 | Mrowka | H02B 1/056 174/138 F |
| 5,343,356 A * | 8/1994 | Hancock | H02B 1/26 174/68.2 |
| 2006/0082264 A1* | 4/2006 | Packard | H02B 1/21 312/223.1 |
| 2006/0209499 A1* | 9/2006 | Rowe | H02B 1/21 361/611 |
| 2011/0149483 A1* | 6/2011 | Diaz | H02B 1/20 361/637 |
| 2015/0041209 A1* | 2/2015 | Bryant | H02B 1/20 174/70 B |

* cited by examiner

*Primary Examiner* — Adam B Dravininkas

(57) ABSTRACT

A panelboard assembly having common components is disclosed. The panelboard assembly includes base rails, a first bus support extending between the base rails, the first bus support accommodating different thickness buses, buses coupled to the first bus support, and one or more breaker mounting barriers received over top of the buses. In some embodiments, the one or more breaker mounting barriers accommodating different width buses. Methods of assembling the panelboard assembly are disclosed, as are other aspects.

16 Claims, 20 Drawing Sheets

ELECTRICAL PANELBOARD ASSEMBLIES AND METHODS

RELATED APPLICATIONS

This application claims priority from U.S. Provisional Patent Application Ser. No. 62/151,754 filed on Apr. 23, 2015, entitled "Revised-P1 Lighting Panel," the disclosure of which is hereby incorporated by reference in its entirety herein.

FIELD

The present invention relates generally to panelboards for electrical power distribution.

BACKGROUND

Panelboards are electrical power distribution devices, typically mounted in enclosures, that provide electrical power, overcurrent protection, short circuit protection and/or disconnecting means (circuit switching) to multiple load circuits. Multiple conductors within the panelboard, having different instantaneous voltage potentials (e.g., A, B, and C phases), are used to power these circuits through device connection points (e.g., circuit breaker mounting locations) distributed at multiple locations throughout the interior of the panelboard.

A typical panelboard assembly can have as many as three main power conductors (e.g., A, B and C phases), with or without an additional main neutral conductor, all operating at different instantaneous voltages. Multiple individual load circuits (e.g., branch circuits) can be established by electrically connecting an external load to these internal conductors through, for example, circuit breakers mounted to the panelboard. If desired, a single panelboard assembly can provide loads at different voltage values (e.g., 110V or 220V) depending on which combination of internal conductors are used to supply a circuit.

In addition to distributing power to multiple external loads, panelboards and their accompanying components may provide overcurrent and/or short circuit protection for the branch circuits. This protection may be achieved by the use of overcurrent protection devices (circuit breakers such as single pole breakers, two pole breakers, GFIs, AFCIs, CAFCIs, switches, or fuses) installed in the panelboard for each branch circuit.

Under short circuit conditions, the electrical impedance on an external load is reduced to a very low value, thus allowing the flow of current many times higher than intended for the branch circuit. An important effect of these extremely high current levels is the creation of intense magnetic fields that may cause very high attractive and repulsive magnetic forces between the various conductors within the circuit and also within the panelboard. These forces can be on the order of hundreds of times greater than the weights of the effected conductor components. These large forces can produce large structural stresses, possibly leading to damage to the panelboard assembly. Thus, depending on the rating of the panelboard assembly, the number of overcurrent protection devices that the panelboard assembly is designed to accommodate, and the various sizes of the bus bars (e.g., length, width, and thickness) due to ratings and material choice, many different panelboard assembly designs have been developed.

Thus, existing panelboards, although adequate for their intended purpose, include designs that are quite divergent from each other because of the different design criteria. This necessitates expensive tooling, expensive inventory of multiple components, and the like for their manufacture.

Therefore, there is a need for improvements to panelboard designs for electrical distribution to make them more cost effective.

SUMMARY

According to a first aspect, a panelboard assembly is provided. The panelboard assembly includes base rails, a first bus support extending between the base rails, one or more buses coupled to the first bus support, and one or more breaker mounting barriers received over top of the one or more buses, wherein the panelboard assembly accommodates one or more buses having different widths and/or thicknesses.

According to a second aspect, a panelboard assembly is provided. The panelboard assembly includes a first and second base rails wherein the first and second base rails are common, a first bus support extending between the first and second base rails, a second bus support extending between the first and second base rails, the first bus support and the second bus support accommodating different thickness buses, at least two phase buses coupled to the first bus support and the second bus support, wherein the at least two phase buses are common, and one or more breaker mounting barriers received over top of the at least two phase buses and mounted to the first and second base rails, the one or more breaker mounting barriers accommodating different width buses.

According to another aspect, a panelboard assembly is provided. The panelboard assembly includes first and second base rails including a top side, wherein the first and second base rails are common, a first bus support extending between and mounted to the top side of the first and second base rails, a second bus support extending between and mounted to the top side of the first and second base rails, one or more phase buses coupled to the first bus support and the second bus support, and one or more breaker mounting barriers received over top of the one or more phase buses and mounted to the top of the first and second base rails.

According to yet another aspect, a method of assembling a panelboard assembly is provided. The method includes providing base rails including a top and a bottom, installing a neutral barrier across the base rails and to a top of the base rails, installing a neutral cross bus on top of the neutral barrier, securing a first bus support on top of the neutral cross bus and neutral barrier, securing a second bus support to the base rails spaced from the first bus support, installing buses on the first bus support and the second bus support, and installing one or more breaker mounting barriers over the buses.

Still other aspects, features, and advantages of the present invention may be readily apparent from the following description by illustrating a number of example embodiments, including the best mode contemplated for carrying out the present invention. The present invention may be capable of other embodiments, and its details may be modified in various respects, all without departing from the substance and scope of the present invention. The invention covers all modifications, equivalents, and alternatives falling within the claims.

BRIEF DESCRIPTION OF DRAWINGS

The drawings, described below, are for illustrative purposes only and are not necessarily drawn to scale. The drawings are not intended to limit the scope of the invention in any way. Wherever possible, the same or like reference numbers will be used throughout the drawings to refer to the same or like parts.

DESCRIPTION

Figure 1:
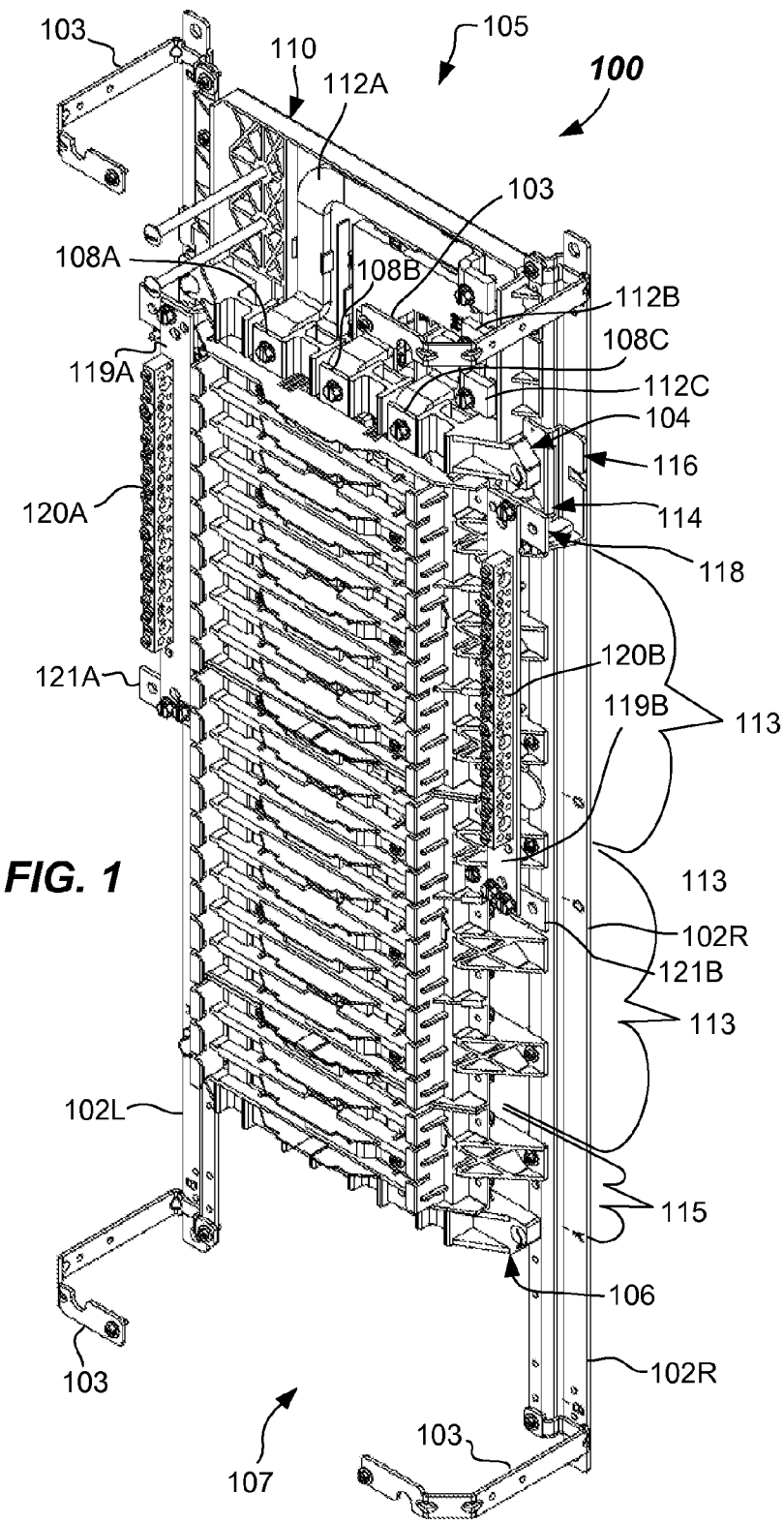
FIG. 1 illustrates a front isometric view of a panelboard assembly according to one or more embodiments.

The aforementioned problems of prior art panelboards are overcome by one or more embodiments of the present invention. In particular, the present invention provides an improved panelboard construction enabling use of some common and some interchangeable components such that panelboards of different sizes and/or electrical amperage ratings or capacities can be inexpensively manufactured.

The inventive panelboard assemblies, in one aspect, may include a bus support allowing various different bus configurations to be mounted thereto. Thus, in one or more embodiments, a panelboard assembly provides both bus location and bus support, regardless of the length or thickness of the buses. The bus support and breaker mounting barriers may include bus support features that function to locate and retain the multiple electrical buses relative to each other, and relative to the other components within the panelboard. Specifically, minimum clearances are maintained between buses, especially in locations where they are not covered by insulation. Structural support may be provided by support features. The support features support the weight of the buses and any components mounted to the buses, position the buses, and also the support features have sufficient bracing strength to keep all buses properly located and separated from each other during operation due to the very high forces that can occur under certain short circuit conditions.

Furthermore, the inventive panelboards include insulation components (e.g., barriers) to electrically isolate the various buses that are operable at different voltage potentials, from each other and from the enclosure (ground).

In more detail, the inventive panelboard assembly includes base rails, a first bus support extending between the base rails, wherein the first bus support accommodates different thickness buses. Thus, multiple materials (e.g., copper or aluminum buses) may be accommodated by one bus support. The buses are coupled to the first bus support, and breaker mounting barriers are received on top of the buses. The breaker mounting barriers may accommodate different widths of buses. Thus, multiple materials and bus capacities (e.g., 125 A-400 A) may be accommodated by the breaker mounting barrier. The first bus support is positioned on top of the base rails. Similarly, a neutral assembly extends between, and is positioned on top of, the base rails. Thus, in another aspect, the inventive panelboard assembly facilitates bottom-up (e.g., gravity) assembly techniques for their manufacturing. This construction also may offer the ability to construct different lengths of panelboards using common components. For example, a common bus support may be used for more than one panelboard configuration. Similarly, modular breaker mounting barriers of different sizes may be stacked in a side-by-side configuration to make up panels of various desired lengths.

Accordingly, embodiments of the invention provide panelboard assemblies of multiple designs that can be produced from combinations of common components and design-specific components, thereby minimizing overall tooling cost and amount of different inventory items, while simplifying handling and assembly and by allowing gravity assembly techniques. The invention will be explained in greater detail with reference to FIGS. 1-12 below.

Figure 11:
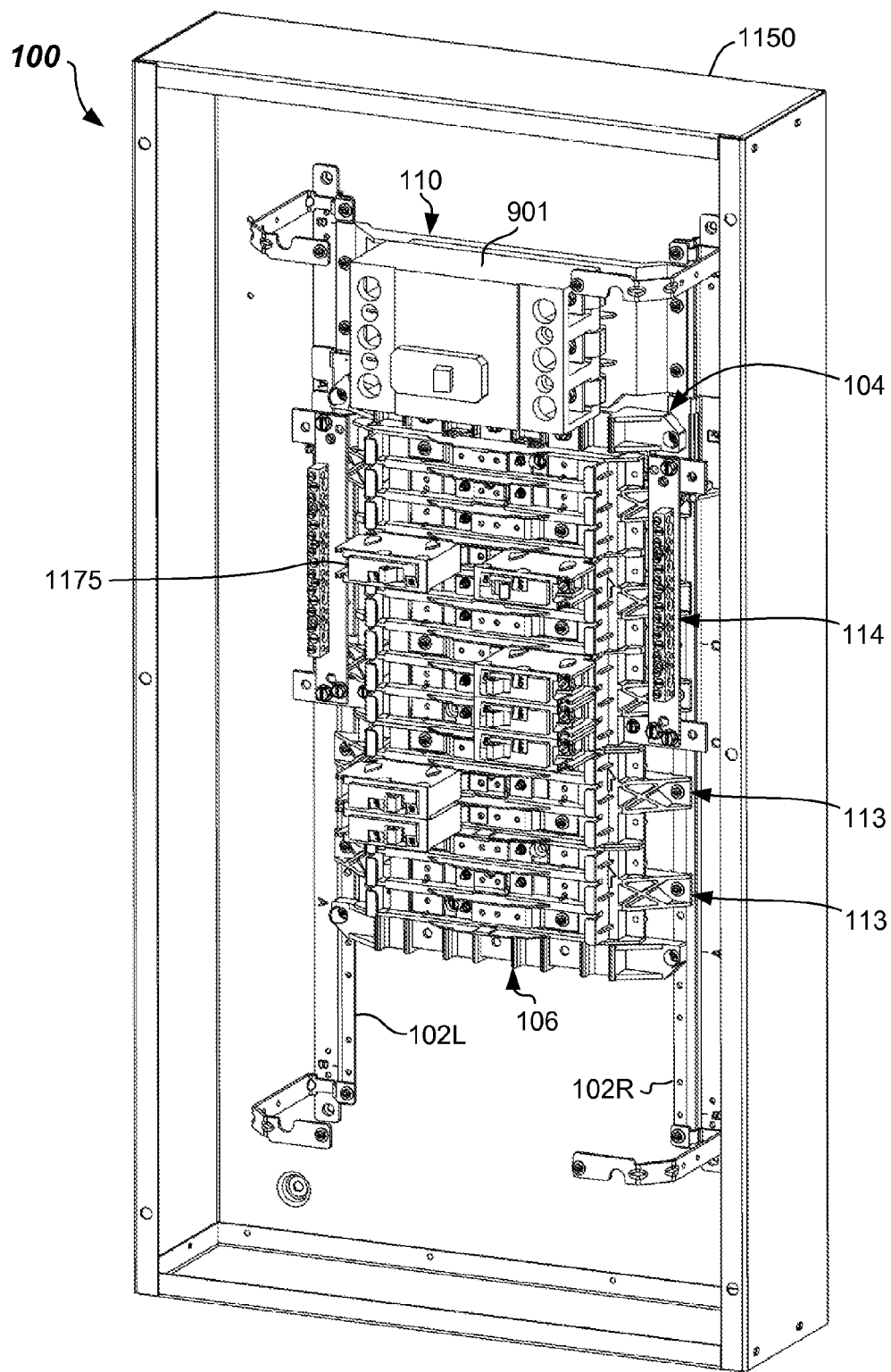
FIG. 11 illustrates a front isometric view of a panelboard including a device platform and a main interconnect device mounted to an enclosure according to one or more embodiments.

(Base Rails) FIG. 1 illustrates an assembly view of a panelboard assembly 100 that may be constructed according to one or more embodiments, for example. The panelboard assembly 100 is configured to receive a main interconnect device (see main interconnect device 901 of FIG. 9) and one or more branch circuit breakers 1175 (see FIG. 11) installed thereon. The panelboard assembly 100 includes a set of base rails 102L, 102R. The base rails 102L, 102R may be linear, have a common cross-sectional shape along portions of the length, and may be configured to attach to an enclosure 1150 as is shown in FIG. 11, such as with fasteners, or the like. For example, base rails 102L, 102R may include attachment features, such as holes at the respective terminal ends of the base rails 102L, 102R, that receive screws that couple the panelboard assembly 100 to an enclosure 1150 (FIG. 11).

Base rails 102L, 102R may include a common cross-sectional profile between the first bus support 104 and the second bus support 106. Base rails 102L, 102R may include an interchangeable construction that may also be symmetrical end to end. Base rails 102L, 102R may be extruded or rolled, for example. Thus, one common base rail design may be used for both base rails 102L, 102R. "Common" as used herein means components that the reference components are identical to one another. The length of the base rails 102L, 102R may be changed for different lengths of the panelboard assemblies 100. A few different lengths of the base rails 102L, 102R may be used for many different panelboard assemblies 100.

Figure 2A:
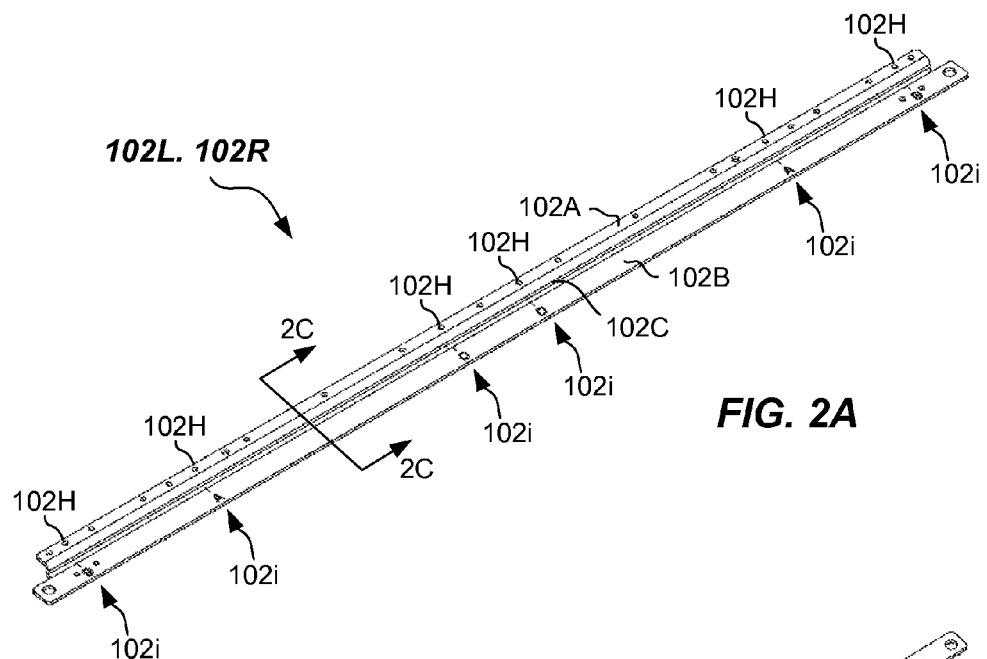
FIGS. 2A-2B illustrates top and bottom isometric views, respectively, of a base rail according to one or more embodiments.
Figure 2B:
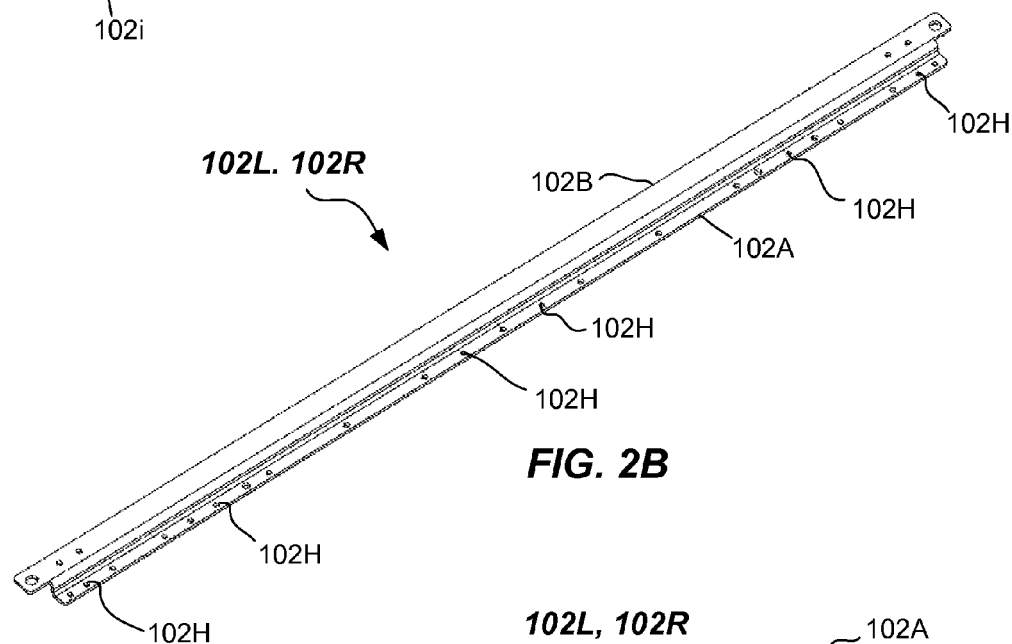
Figure 2C:
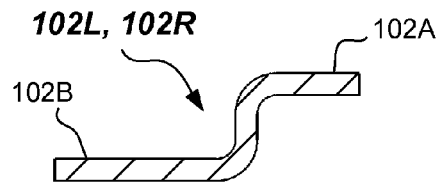
FIG. 2C illustrates a cross-sectional view of a base rail according to one or more embodiments.

The base rails 102L, 102R, as best shown in FIGS. 2A-2C, may be made from sheet steel and may be bent to have a cross-sectional shape as shown in FIG. 2C. Base rails 102L, 102R may be marked with indicia 102$i$ (e.g., A, B, O) along a length thereof at different spaced locations. Other indicia may be used or added. These marked locations are disposed adjacent to where component attachment holes 102H are provided to aid in assembly of the various different configurations of the panelboard 100 that can be made from the common components. As shown in FIGS. 2A-2C, the base rails 102L, 102R include a first portion 102A that preferably all the cross rail components will rest upon or mount to (to be described herein), and a second portion 102B that is lower and which may rest against the enclosure 1150 (FIG. 11). The base rails 102L, 102R, depending upon the panelboard assembly 100 to be manufactured, may include a length between about 45 cm for a 250 A maximum, 18 circuit space design to about 120 cm for a 250 A maximum, 66 circuit space design with additional space for accessories. A length of between about 120 cm (for a 400 A maximum, 18 circuit space design) to about 166 cm (for a 400 A maximum, 66 circuit space design), with no space for an added accessory, may be used. Common lengths to build a 250 A family of panelboard assemblies 100 may be about 45 cm, 60 cm, 75 cm, 90 cm, 105 cm, and 120 cm. For the 400 A family, common lengths to build a 400 A family of panelboard assemblies 100 may be about 120 cm, 135 cm, 150 cm, and 165 cm. A common cross section may be used for each rail length, so that one tool can be used to make all base rails 102L, 102R.

Again referring to FIG. 1, cover supports 103 may be attached to the terminal ends of the base rails 102L, 102R in some embodiments to support a cover (not shown), which is configured to cover the branch circuit breakers that are to be coupled to the panelboard assembly 100.

(Bus Supports) Panelboard assembly 100 includes a first bus support 104, and may include a plurality of bus supports in some embodiments (e.g., the first bus support 104 and a second bus support 106 spaced apart from the first bus support 104). First and second bus supports 104, 106 may be common in some embodiments. First bus support 104 extends laterally between the base rails 102L, 102R, as shown. First bus support 104 is configured to accommodate different thickness of buses as will be described in detail below. In some embodiments, the first bus support 104 may be coupled proximate to a first end 105 of the panelboard assembly 100 and a second bus support 106 may be coupled proximate to a second end 107 of the panelboard assembly 100.

Figure 3A:
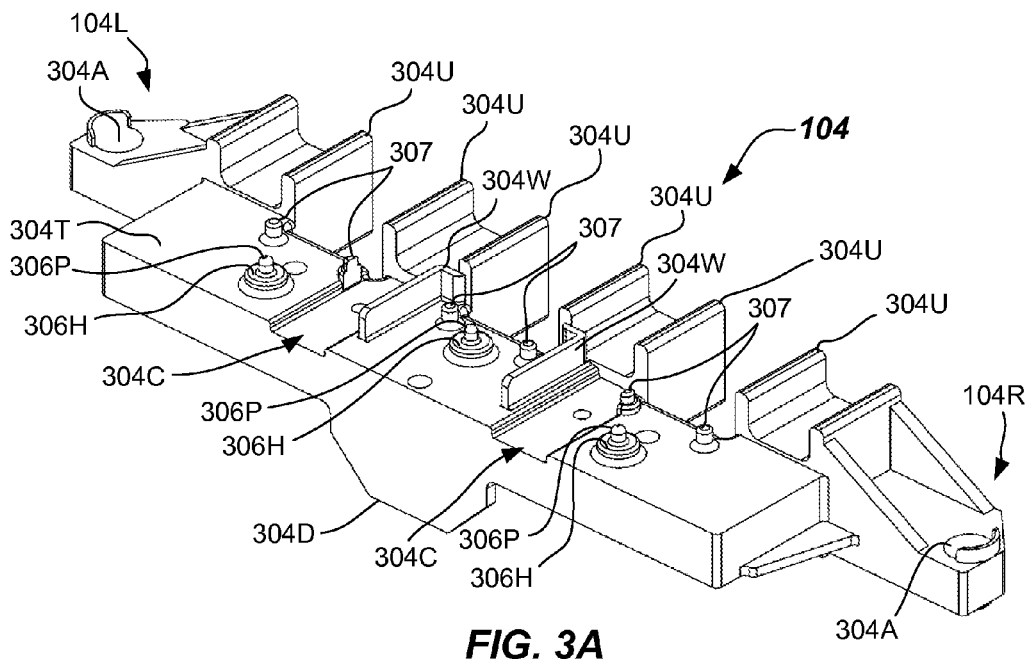
FIG. 3A illustrates a front isometric view of a bus support according to one or more embodiments.
Figure 3B:
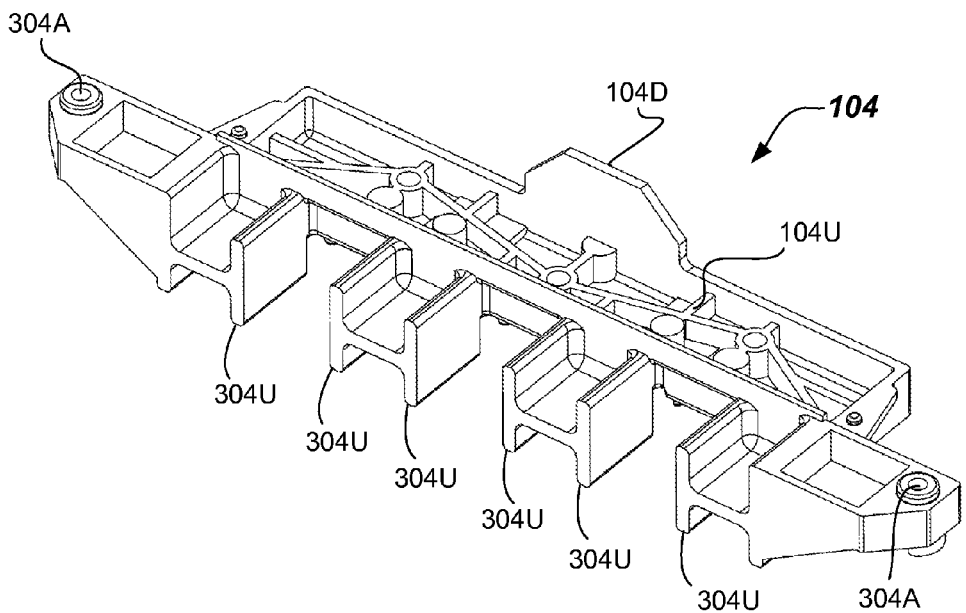
FIG. 3B illustrates a rear isometric view of a bus support according to one or more embodiments.

One configuration of the first bus support 104 (and also the second bus support 106) is shown in FIGS. 3A and 3B illustrating top and bottom views, respectively. The first bus support 104 may be coupled to the tops of the base rails 102L, 102R as shown in FIG. 1. Like the first bus support 104, the second bus support 106 may also be coupled across and attached to a top of the base rails 102L, 102R. The second bus support 106 may also accommodate different thickness of buses 508D, 508E as described herein. The buses 108A, 108B, 108C, for example, may extend between, and may be coupled to, the first bus support 104 and the second bus support 106 in one or more embodiments. Coupling between the buses (e.g., buses 108A, 108B, 108C as shown in FIG. 4F) and the first bus support 104 may be by registry of the buses 108A, 108B, 108C on locating features formed on the first bus support 104 and the second bus support 106.

For example, the first bus support 104 may include longitudinal locating features that may comprise longitudinal locating pilots 306P (e.g., pins), which may locate on apertures 511 (FIG. 5A) formed in the buses 108A-108C. This prevents motion of the buses 108A-108C in the X (lateral) and Y (length) directions relative to the first bus support 104. The second bus support 106 may also include such longitudinal locating features. In addition, the locating features may include height locating features formed on the first bus support 104. The height locating features may include first locating surfaces 306H that function to set the height of the buses 108A, 108B, 108C relative to the first bus support 104 in some embodiments. First locating surfaces 306H may comprise planar surfaces that surround the longitudinal locating pilots 306P. First bus support 104 may further include pins 307 extending from a top surface 304T that may function as first height locating surfaces in some embodiments, as will be described below.

In more detail, the first bus support 104 may include a first end 104L and a second end 104R, each end having an aperture 304A configured to receive a fastener (e.g., a screw) therein. First bus support 104 may include one or more arc walls 304W that function to prevent inter-phase arcing between the buses 108A-108C. First bus support 104 may include one or more channels 304C that function to receive protuberances 624 (FIG. 6B) formed on an underside 613U of the breaker mounting barriers 113, 115. First bus support 104 may include a tongue 304D that functions as an assembly aid to keep the first bus support 104 level during assembly, such as when the buses 108A-108C are placed thereon. Further, first bus support 104 may include one or more upright walls 304U adjacent to the sides of the buses 108A-108C at the ends thereof that are configured to extend above top surfaces of the buses 108A-108C and that may function to prevent interphase arcing. Second bus support 106 may include some or preferably all of these features, as well.

(Buses) Panelboard assembly 100 may include two or more buses therein. For example, in the depicted example three buses 108A, 108B, 108C are adapted to be coupled to the first bus support 104 and the second bus support 106. However, it should be recognized that in some embodiments, the buses may comprise only A-phase and C-phase buses, with the central location being intentionally left empty. In other embodiments, just a single phase (e.g., either A or C-phase) may be used. In the depicted embodiment, the buses (e.g., buses 108A, 108B, 108C) for any particular panelboard design may be identical to each other (i.e., common), although they may vary in thickness or width or length for different configurations of the panelboard assembly 100. For example, a 250 Amp panelboard assembly 100 may accommodate buses 108A-108C with a thickness of about 3.2 mm for copper and about 4.8 mm for aluminum, and a width of about 25 mm for both. A 400 Amp panelboard assembly 100 may accommodate a thickness of about 3.2 mm for copper and about 4.8 mm for aluminum, and a width of about 56 mm. Other designs with other dimensions may be used. A common bus support 104, 106 may be used for all thicknesses. The length of the buses 108A, 108B, and 108C may vary based upon the number of circuit breakers to be accepted by the panelboard assembly 100, and the number of other devices (e.g., accessories) included on the panelboard assembly 100. The illustrated configuration of the first bus support 104 allows different thicknesses to be used for the buses 108A, 108B, 108C for different design configurations, while using a common design of the first bus support 104, and possibly the second bus support 106 in some embodiments.

Figure 5A:
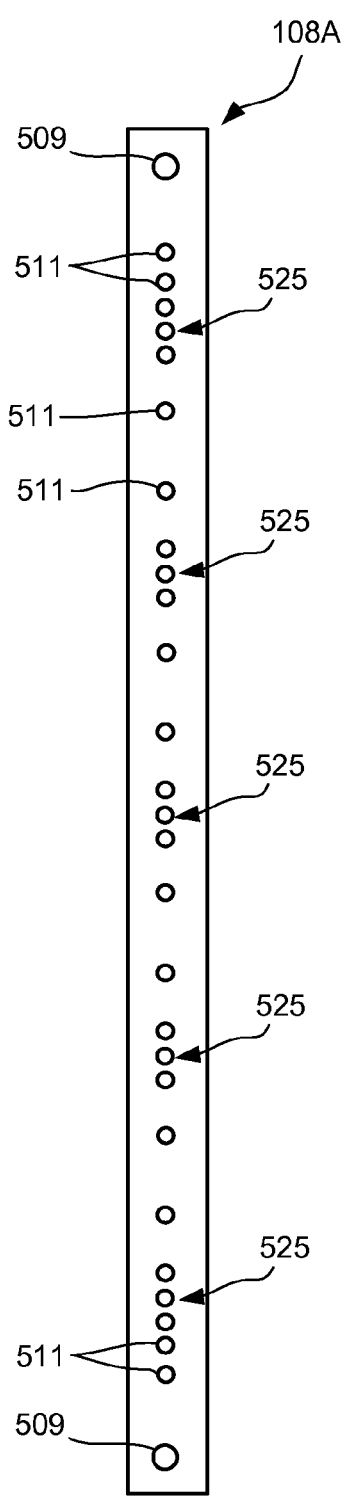
FIG. 5A illustrates a front plan view of a narrow width bus design according to one or more embodiments.
Figure 5B:
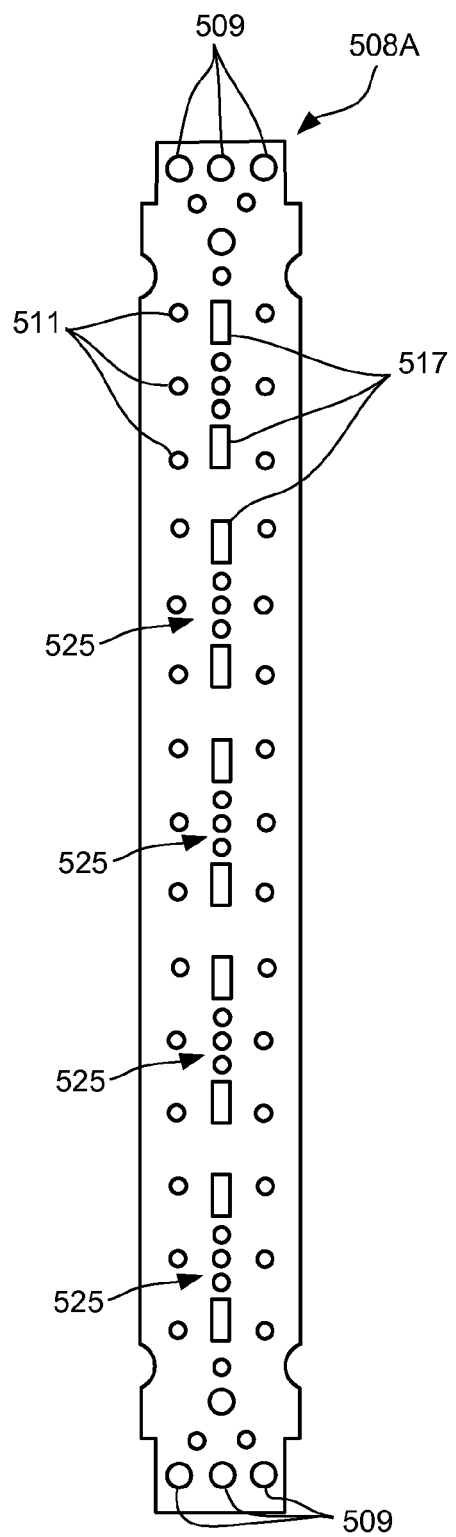
FIG. 5B illustrates a front plan view of a wide width bus design according to one or more embodiments.
Figure 5C:
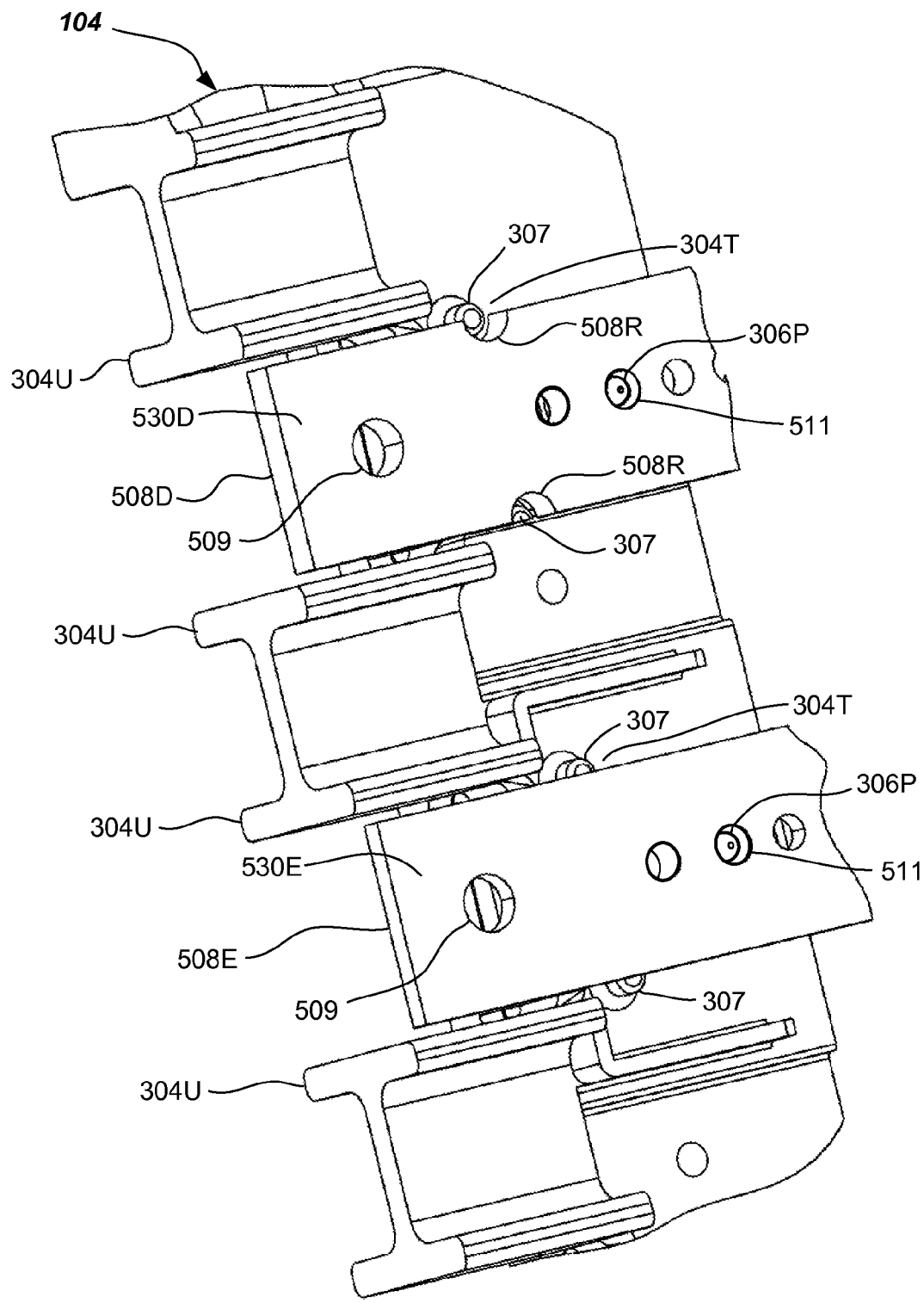
FIG. 5C illustrates a partial isometric view showing both a thin bus design and a thick bus design mounted to a first bus support according to one or more embodiments.

Referring now to FIG. 5C, a mechanism for accommodating different thicknesses of buses 108A-108C is described. The first bus support 104 is shown (only a portion shown) supporting a thick version of the bus 508D (e.g., that may be made of aluminum) alongside of a thin version of the bus 508E (e.g., that may be made of copper) for illustration purposes. The first bus support 104 comprises spacers (e.g., pins 307) that are configured to contact an underside of the bus 508E (thin bus design) and space the bus 508E a distance away from an undersurface (e.g., top surface 304T under the bus 508E). For the thick design of the bus 508D, side recesses 508R, such as half circles shown, may be formed in the sides of the bus 508D. Side recesses 508R may be configured to receive the spacers (e.g., pins 307) and may allow the bus 508D to bypass the spacers (e.g., pins 307) and become in contact with the first locating surface 306H previously described. However, other suitable height locating features may be used. Thus, the spacers (e.g., pins 307) may be received adjacent to lateral sides of the bus 508D (e.g., thick bus design) or underneath the bus 508E (e.g., thin bus design).

The spacing distance provided by the spacers (e.g., pins 307) may be the difference in thickness between the thick version of the bus 508D and thin version of the bus 508E. Thus, regardless of whether an aluminum bus or a copper bus is used in the panelboard assembly 100, the location of upper bus surfaces 530D, 530E of the buses 508D, 508E may be provided at the same level. This same spacing feature may be used for different thicknesses of buses made of the same material, as well, such as when a higher amperage rating is sought. This spacing feature allows the use of a common design of the first bus support 104 for different thicknesses of the buses (e.g., buses 508D, 508E) and thereby provides a common location of an upper bus surface (e.g., upper bus surface 530D, 530E) for both thin bus designs and thick bus designs. This spacing feature may also be provided on the second bus support 106. Also shown in FIG. 5C is the registration of a longitudinal locating pilots 306P received in an aperture 511 of the thick bus 508D and the thin bus 508E.

Top plan views of two different width bus designs are shown in FIGS. 5A and 5B. FIG. 5A illustrates a narrow width design of a bus 108A, whereas FIG. 5B illustrates a wide width design of a bus 508A. For a particular panelboard assembly 100 including the narrow width design, the buses 108B and 108C may be common (i.e., identical) to bus 108A. For a panelboard assembly 100 including the wide width design, the buses 508B and 508C will be common (i.e., identical) to bus 508A. In the case of a single phase design, only two common buses may be used. Having all buses (e.g., buses 108A-108C or buses 508A-508C) be common allows for complete interchangeability thereby reducing manufacturing and inventory complexity and cost.

Buses 108A, 508A may be made of a conductive metal such as copper or aluminum, or copper or aluminum alloys. Buses 108A, 508A include a symmetrical design end to end, and may also be symmetrical about the centerline along a length (longest dimension) thereof. The other buses 108C, 108D, 508A, 508C may be made of the same material. Ends of buses 108A, 508A may include holes 509 that may be used to electrically couple to a conductor 112A (FIG. 1) of a device platform 110 on one end and possibly to another device (e.g., a switch, a surge protection device, circuit breaker, or a monitoring and/or control device, for example) on the other end in some embodiments. Optionally, lugs may be connected to the buses through the holes 509. Buses 108A, 508A may have a length of between about 28 cm and about 89 cm for the 250 A version, and between about 33 cm and about 94 cm for the 400 A version, for example. Other lengths may be used. Each of the buses 108A-108C (narrow width design) and buses 508A-508C (wide width design) may include a plurality of locating features (e.g., apertures 511) arranged along the length thereof in a pattern. These apertures 511 (a few labeled in FIGS. 10A and 10B) serve to locate and register the buses 108A, 108B, 108C on the first and second bus supports 104, 106, but also may locate the breaker mounting barriers 113, 115 (see FIG. 1) on the buses 108A, 108B, 108C. Furthermore, certain three-hole patterns 525 may be used to connect conductive spacers 736A-736C used to couple the buses 108A-108C (or 508A-508C) to the mounted circuit breakers (See FIGS. 8A-8F and 11). For the buses 108A-108C (narrow width design), a single line of locating features comprising apertures 511 may be located along the length and may be located along the centerline of the buses 108A, 108B, 108C. For the buses 508A (wide width design), multiple lines of locating features may be located along the length thereof. The locating features may include multiple lines of apertures 511 and bracing features 517 (e.g., slots) that interface with bracing members 634 and function to help brace the buses 508A-508C in the panelboard assembly 100, when the wide bus design is used. The bracing members 634 also act as bracing for the narrow bus designs as shown in FIG. 10A.

Figure 10A:
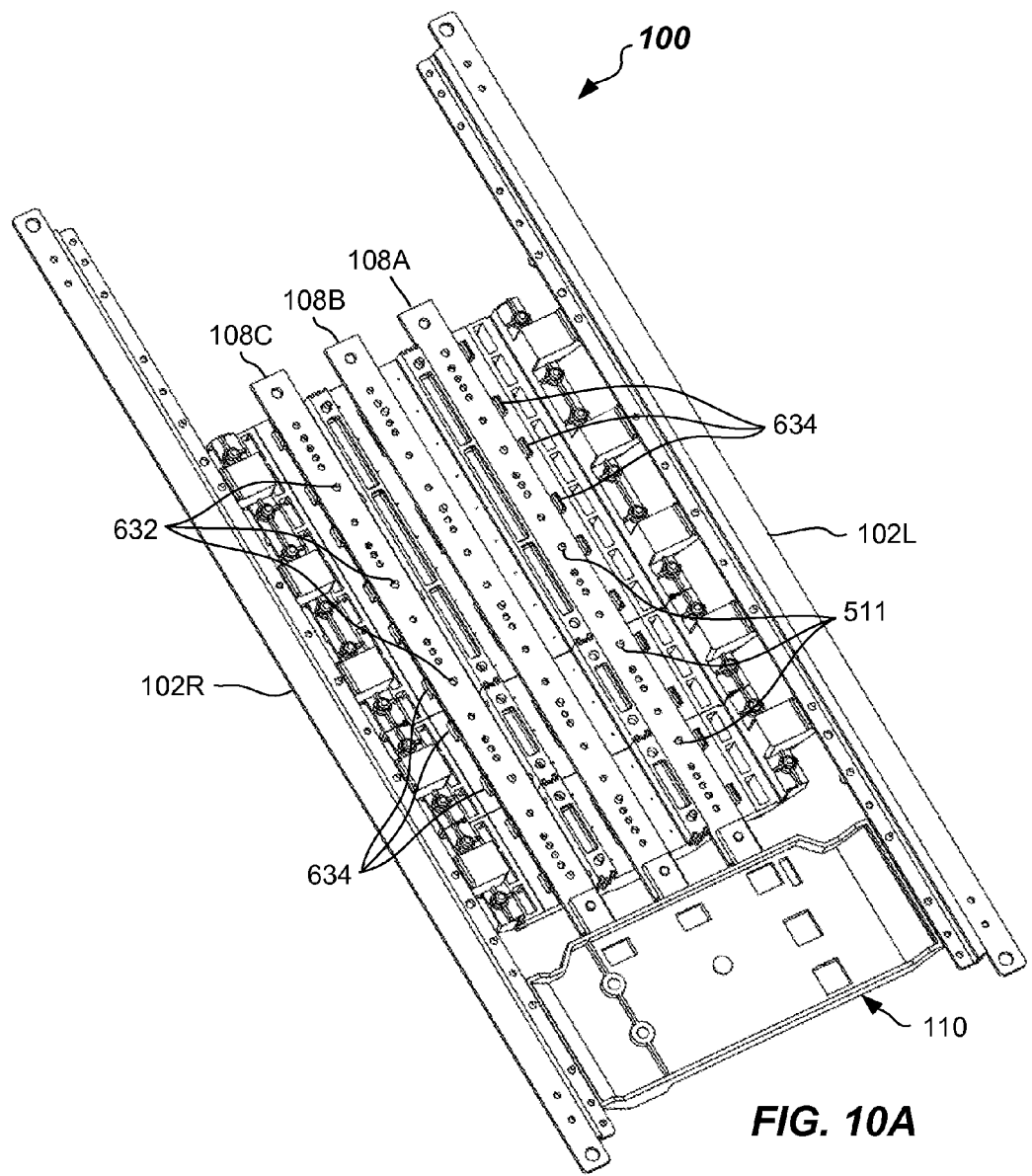
FIG. 10A illustrates a rear isometric view of a panelboard including a narrow width bus design according to one or more embodiments.

Underside views of portions of the panelboard assembly 100 (with neutral assembly 114 and first and second bus supports 104, 106 removed for illustration purposes) but including buses 108A-108C of the narrow bus configuration are shown in FIG. 10A. This view illustrates not only the electrical connection to the device platform 110, but also the registry of locator screws 632 in the apertures 511 along the length of the buses 108A-108C. This fixes the location of the buses 108A-108C to the breaker mounting barriers 113, 115 along their length.

Figure 10B:
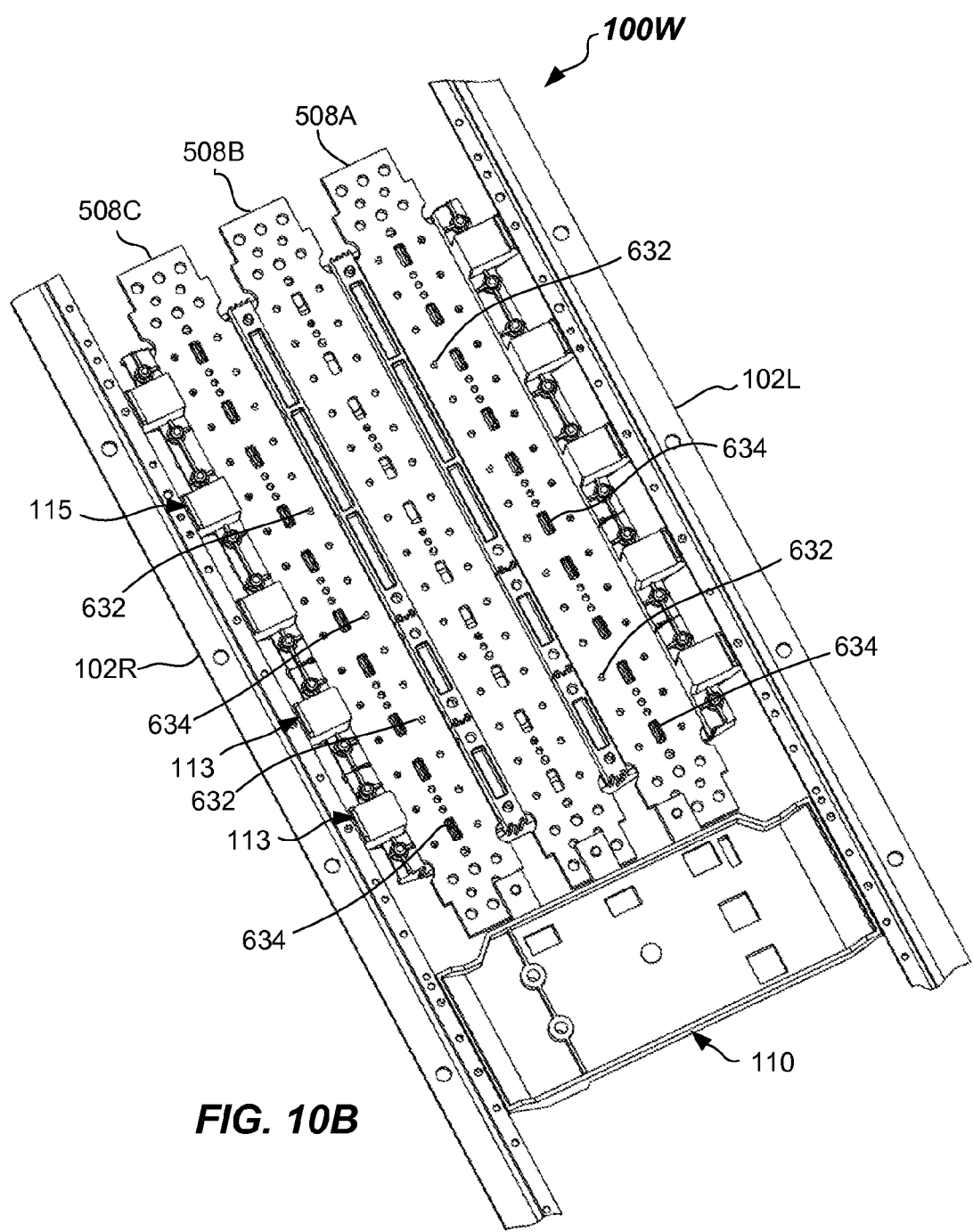
FIG. 10B illustrates a rear isometric view of a panelboard including a wide width bus design according to one or more embodiments.

Likewise, FIG. 10B illustrates underside views of portions of the panelboard assembly 100W (with neutral assembly 114 and first and second bus supports 104, 106 removed for illustration purposes) including buses 508A-508C of the wide bus configuration. Wide bus configurations may be used when higher panel amperage ratings (e.g., 400 A) are desired. Besides the registry on the locator screws 632 in apertures 511, registry of the bracing features 517 (FIG. 5B) of buses 508A-508C with the bracing members 634 on the breaker mounting barriers 113, 115 are shown. Thus, it should be apparent that the breaker mounting barriers 113, 115 can each accommodate either a narrow width design or a wide width design.

As shown in FIG. 1, panelboard assembly 100 may include a breaker mounting system including one or more breaker mounting barriers 113 and/or 115 received over top of the buses 108A, 108B, 108C (or buses 508A, 508B, 508C). Breaker mounting system is configured to receive circuit breakers thereon, such as one-pole circuit breakers or two-pole circuit breakers, for example. Circuit breakers may have handle ratings of between about 15 Amp and 30 Amp for example. However, other handle ratings may be used. Breaker mounting system may include one or a collection of breaker mounting barriers 113, 115 wherein the breaker mounting barriers 113, 115 may be coupled to the base rails 102L, 102R by fasteners (e.g., screws, bolts, or the like).

For example, as shown in FIG. 1, two breaker mounting barriers 113 of a first type are provided in a side-to-side relationship overtop of the buses 108A, 108B, and 108C. A breaker mounting barrier 115 of a second type may be received elsewhere, such as at an end of a breaker mounting barrier 113 of a first type. Thus, various numbers of breaker mounting barriers 113 of a first type and breaker mounting barriers 115 of a second type may be assembled in a side-to-side relationship to make any desired length for the panelboard assembly 100 and to accommodate any desired number of circuit breakers.

Figure 6A:
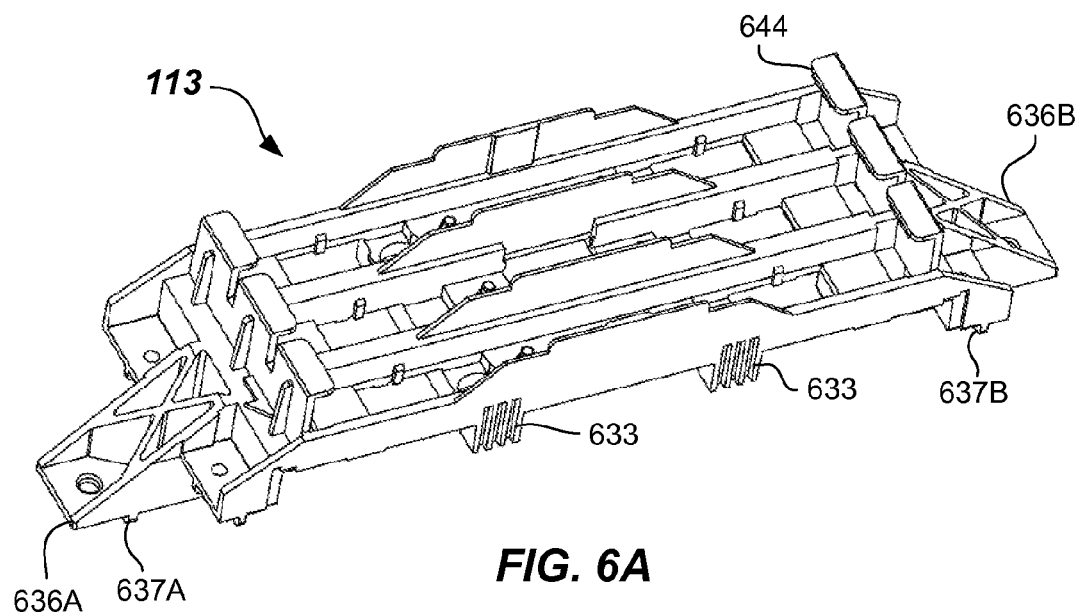
FIG. 6A illustrates a front isometric view of a breaker mounting barrier according to one or more embodiments.
Figure 6B:
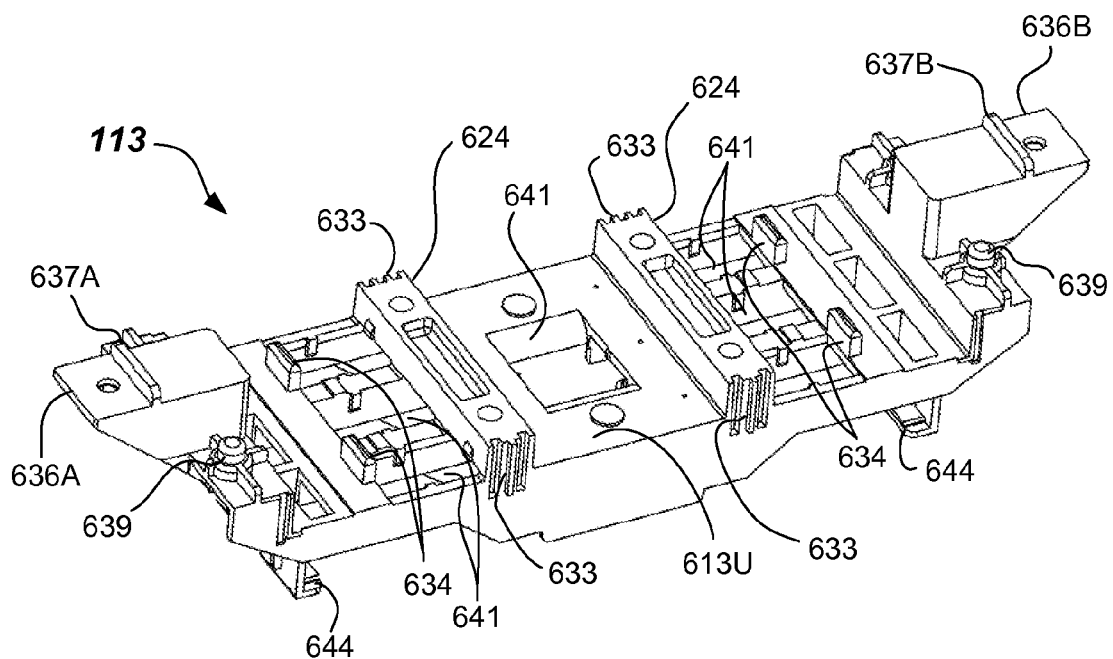
FIG. 6B illustrates a rear isometric view of a breaker mounting barrier according to one or more embodiments.
Figure 6C:
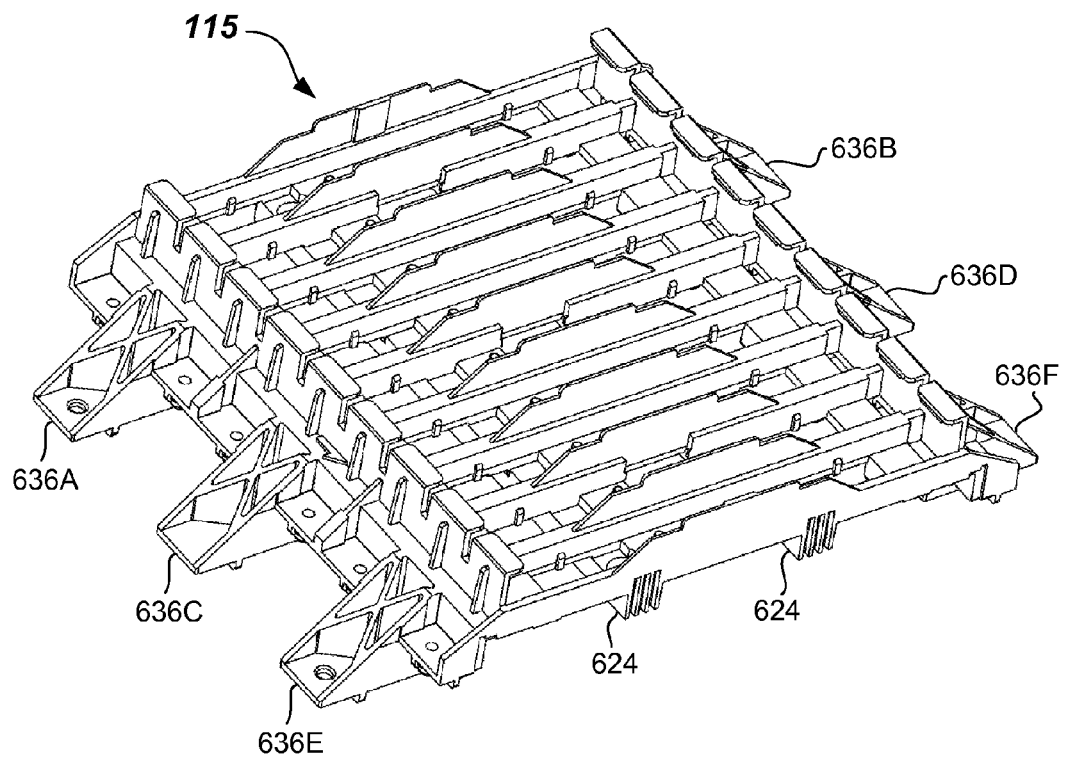
FIG. 6C illustrates a front isometric view of another breaker mounting barrier according to an additional embodiments.

Now referring to FIGS. 6A and 6B, top and bottom isometric views of a first narrow version of the breaker mounting barrier 113 is shown. FIG. 6C illustrates a wide version of the breaker mounting barrier 115. The narrow version of the breaker mounting barrier 113 may include six standard size mounting locations configured to accommodate six standard sizes breakers (e.g., 1 inch breakers), whereas the wide version of the breaker mounting barrier 115 may accommodate eighteen standard size mounting locations configured to accommodate eighteen standard size breakers, for example. However, the breaker mounting barriers 113, 115 may be designed to accommodate a different number or sizes of circuit breakers (e.g., ½" or ¾" breakers). Thus, it should be recognized that panelboard assemblies 100, 100W of various sizes may be easily constructed using various combinations of certain numbers the narrow version of the breaker mounting barrier 113 and certain numbers of the wide version of the breaker mounting barrier 115. Table 1 below illustrates this adaptable size configuration feature. Other configurations and even a larger number of circuit breakers may be accommodated by adding additional breaker mounting barriers 113, 115.

TABLE 1

Configuration of Some Possible Panelboard Sizes

| Panelboard Size | # of Narrow | # of Wide |
|---|---|---|
| 6 Breakers | 1 | 0 |
| 12 Breakers | 2 | 0 |
| 18 Breakers | 0 | 1 |
| 24 Breakers | 1 | 1 |
| 30 Breakers | 2 | 1 |
| 36 Breakers | 0 | 2 |
| 42 Breakers | 1 | 2 |

Again referring to FIGS. 6A-6B, the breaker mounting barrier 113 may include a first foot 636A and a second foot 636B, each of which is configured to couple with, and attach to, a top side of the base rails 102L, 102R. First foot 636A and second foot 636B may include aligning members 637A, 637B such as wings shown. Aligning members 637A, 637B aid in aligning the breaker mounting barrier 113 to the base rails 102L, 102R by registering on the inside edges thereof. Breaker mounting barrier 113 may include protuberances 624 that may help electrically separate the buses 108A-108C, but also may be received in channels 304C (FIG. 3) to prevent interphase arcing. Protuberances 624 may be about 11 mm tall and about 14 mm wide, for example. Other sizes may be used. Serrated edges 633 may be provided on the ends of the protuberances 624 to allow better through air phase separation between mating breaker mounting barriers 113, 115. The same features may be provided on the wide version of the breaker mounting barrier 115, except that the wide version may include multiple feet 636A-636F.

Figure 9:
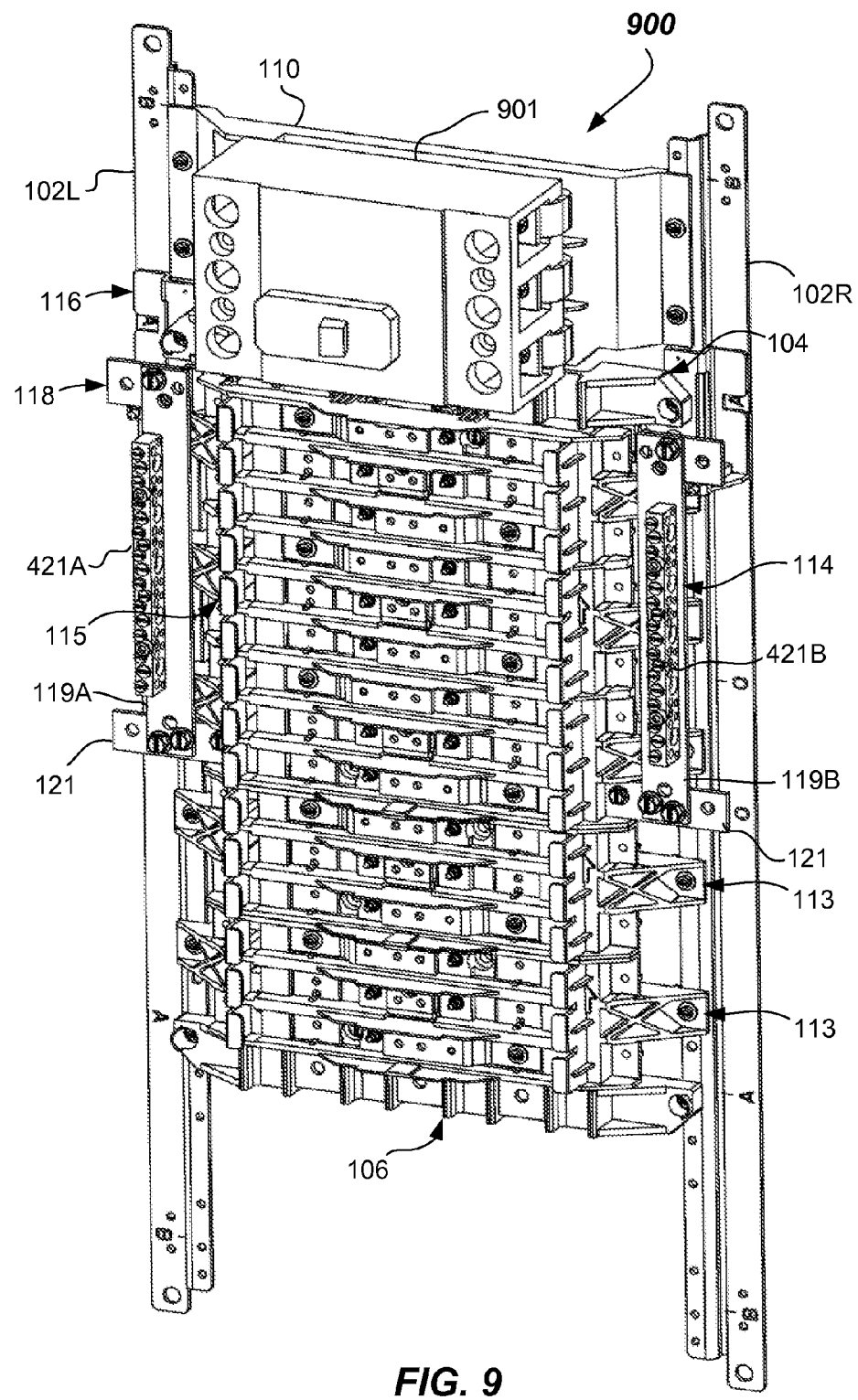
FIG. 9 illustrates a front isometric view of a panelboard assembly according to one or more embodiments.

As previously discussed, the breaker mounting barrier 113 may include bracing members 634 along their length at intervals that interface with bracing features 517 formed on the buses 508A, 508C if wide bus design is used. Insulating boss features 639 (e.g., pins) may be provided on the underside of the breaker mounting barrier 113 to aid in installing the neutral assembly. Numerous rectangular holes 641 may be provided through the breaker mounting barrier 113 at desired locations to enable making electrical connection with the circuit breakers mounted to the breaker mounting barrier 113 via conductive spacers (FIG. 9). Breaker mounting barrier 113 may include hooks 644 that are configured to receive a recess in the circuit breakers to be mounted thereat.

(Device Platform) As shown in FIG. 1, panelboard assembly 100 may include a device platform 110 configured to couple to a main interconnect device (e.g., main interconnect device 901 of FIG. 9) such as a circuit breaker, a switch, or the like. Optionally, a lug kit including lugs may be attached to each of the buses 108A, 108B, and 108C. Device platform 110 may also couple to the top of the base rails 102L, 102R. Device platform 110 may include an insulating base 110B and conductors 112A, 112B, 112C each of which are adapted to couple to the ends of the buses 108A, 108B, 108C (or buses 508A, 508B, 508C), respectively, and to the load side of the main interconnect device 901. The main interconnect device 901 may be a main circuit breaker having an amperage (handle) rating of between 225 A and 400 A, for example. Main circuit breakers of other ratings may be used.

Figure 4A:
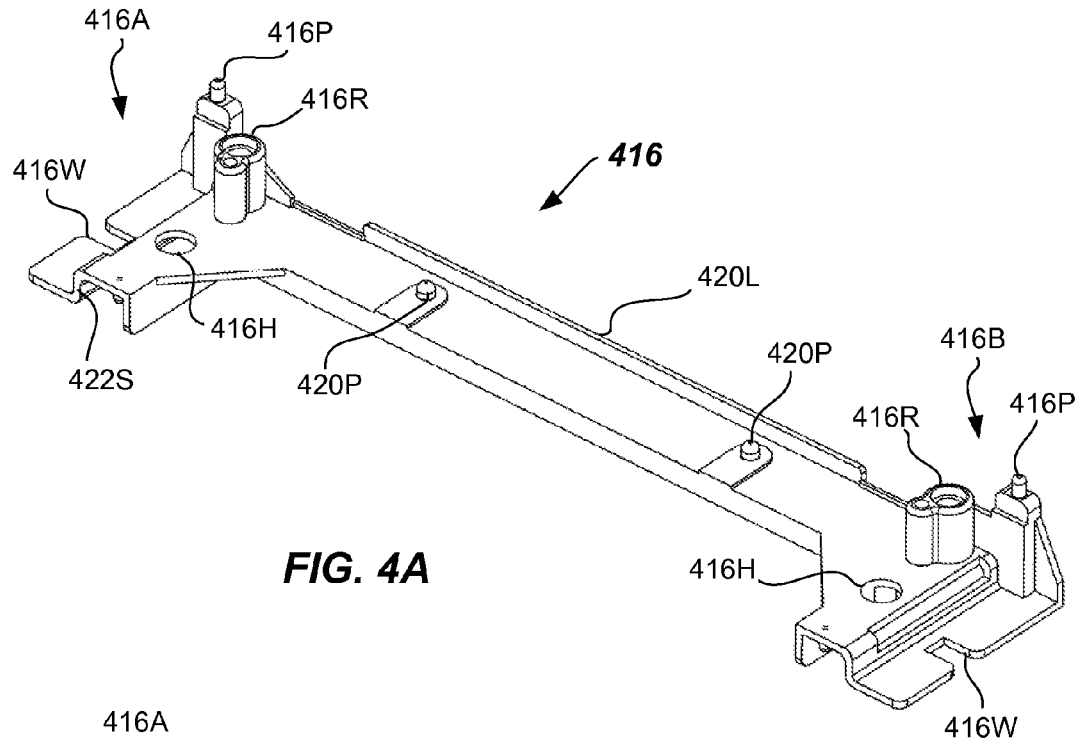
FIG. 4A illustrates a front isometric view of a neutral barrier according to one or more embodiments.
Figure 4B:
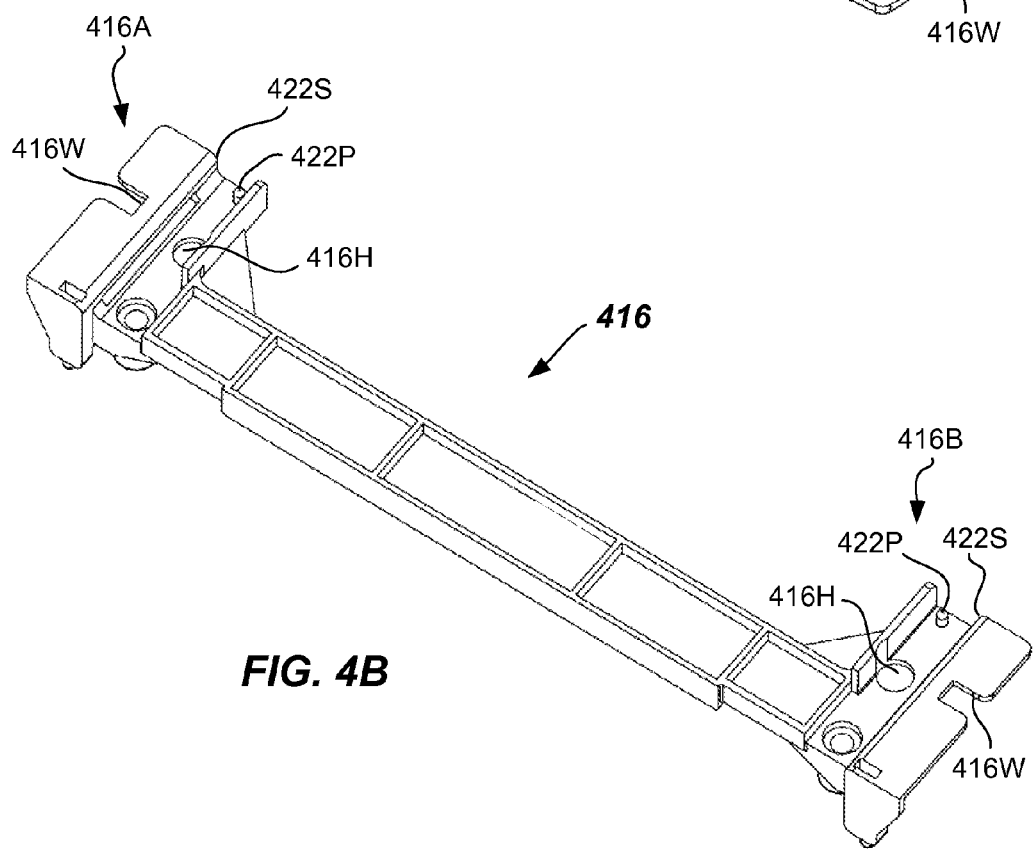
FIG. 4B illustrates a rear isometric view of a neutral barrier according to one or more embodiments.
Figure 4C:
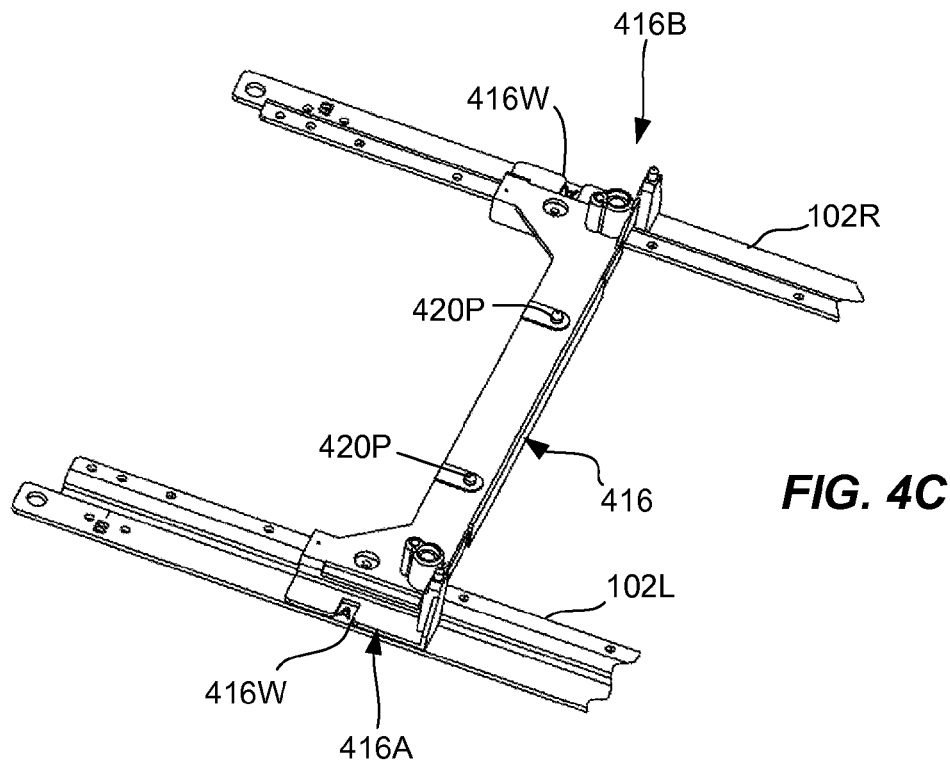
FIG. 4C illustrates a front isometric view of a neutral barrier coupled across a first base rail and a second base rail according to one or more embodiments.
Figure 4D:
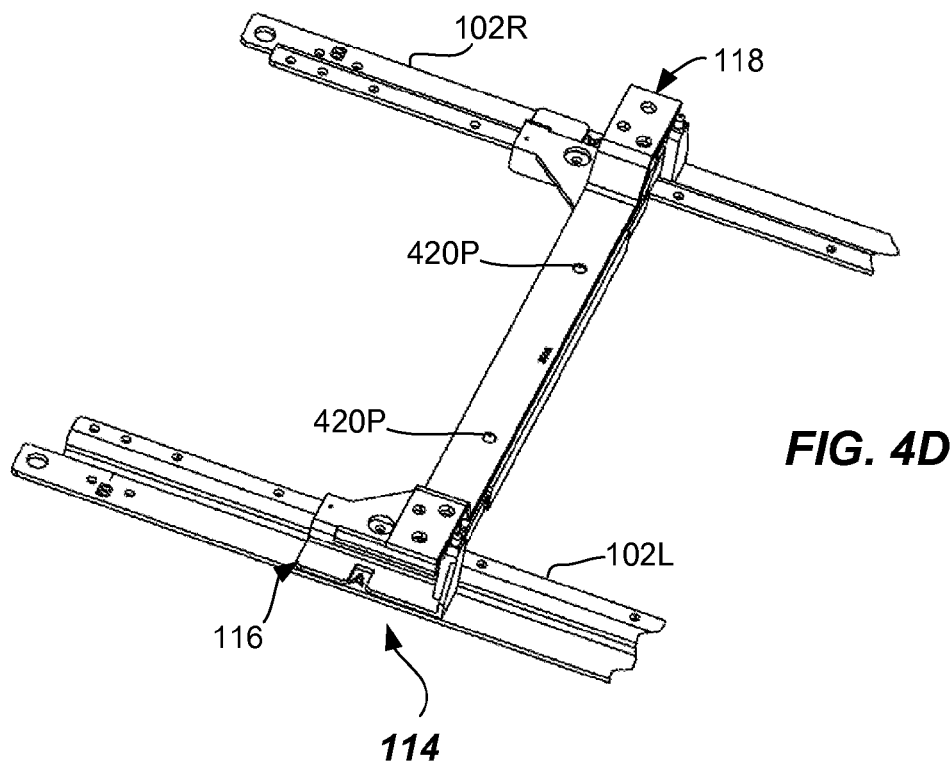
FIG. 4D illustrates a front isometric view of a neutral cross bus mounted on top of a neutral barrier according to one or more embodiments.
Figure 4E:
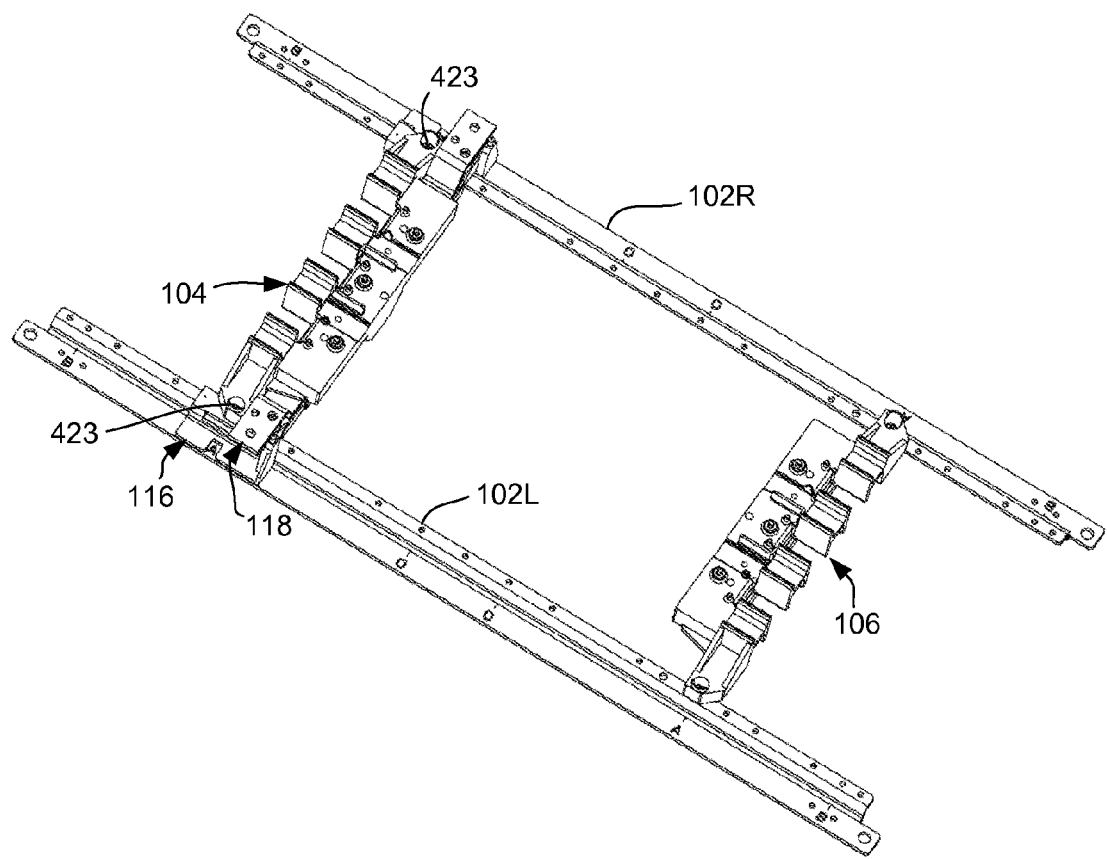
FIG. 4E illustrates a front isometric view of a first bus support mounted on a subassembly of a neutral cross bar and neutral barrier, and also illustrating a second bus support according to one or more embodiments.
Figure 4F:
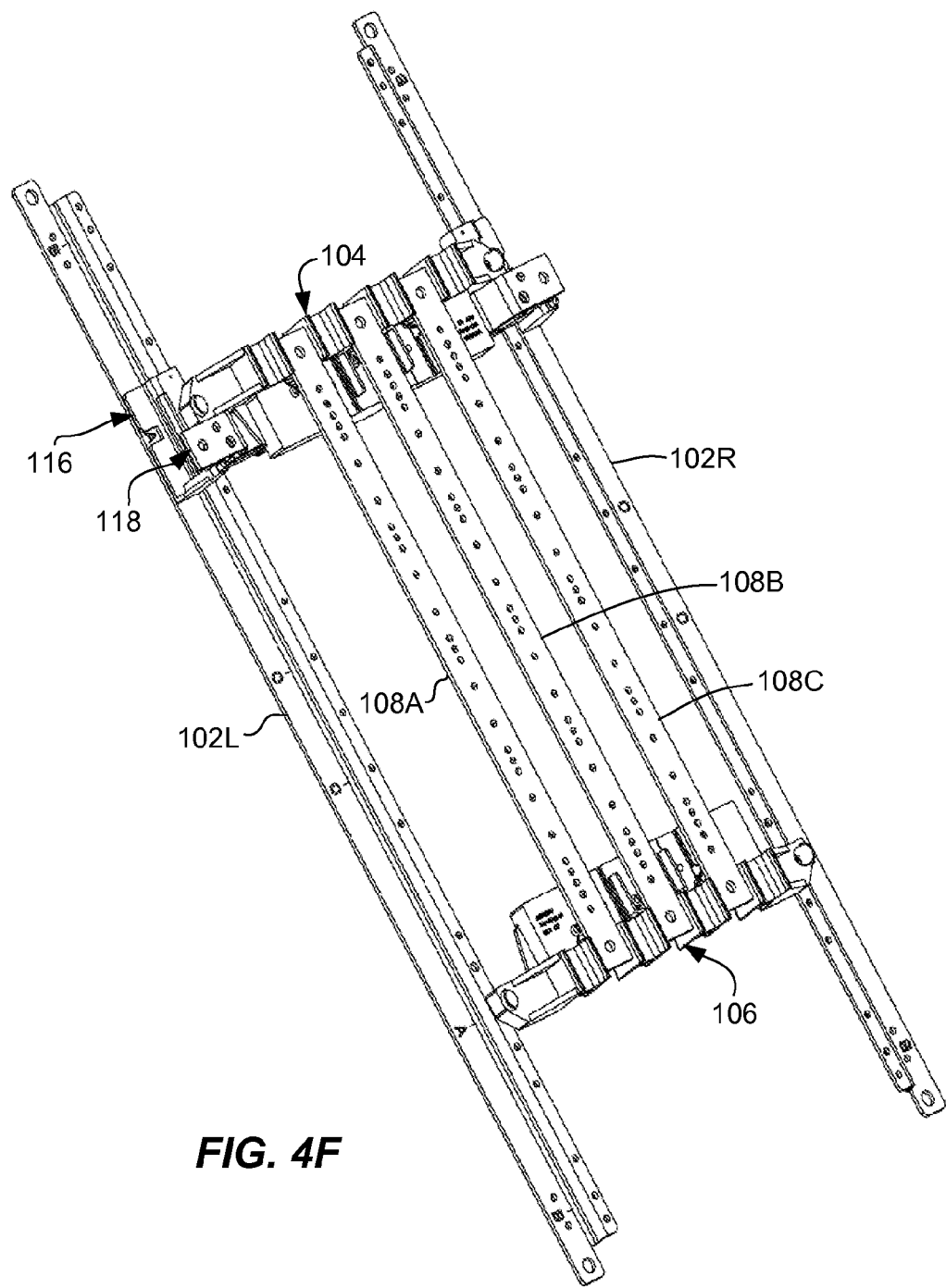
FIG. 4F illustrates a front isometric view of a subassembly of a neutral cross bar and neutral barrier, first and second bus supports and buses extending between the bus supports according to one or more embodiments.

(Neutral Assembly) In more detail, as shown in FIG. 1 and FIGS. 4A-4F, the panelboard assembly 100 may include a neutral assembly 114 configured to provide neutral bar mounting access on both sides of the panelboard assembly 100. Neutral assembly 114 may include at least a neutral barrier 116 and a neutral cross bus 118. Neutral barrier 116 is made of an insulating material, such as plastic, whereas neutral cross bus 118 is made of a conductive material such as copper, aluminum, or a copper or aluminum alloy. Neutral barrier 116 may be coupled across the base rails 102L, 102R as shown in FIG. 4C. Neutral barrier 116 may include a first side 416A that rests on a top of the first base rail 102L, and a second side 416B that rests on a top of the second rail 102R.

A window 416W may be provided on one or both of the first side 416A and the second side 416B, which may be aligned with indicia (e.g., A, B, or O shown) marked on the rails 102L, 102R as an assembly aid to ensure proper placement of the neutral barrier 116.

The neutral cross bar 418 may be assembled on top of the neutral barrier 416, and register upon registration features of the neutral barrier 116 as shown in FIG. 4D. For example, interior registration features may be pins 420P or the like that register in holes formed in the neutral cross bar 418. Optionally, or additionally one or more lips 420L may be provided on the neutral barrier 116. The interior registration features (e.g., pins 420P and or lips 420L) function to position the neutral cross bus 118 in a defined lateral and longitudinal position relative to the neutral barrier 116. Other types of registration features may be used.

Second registration features may be provided on the first side 416A and the second side 416B and function to position the neutral assembly 114 laterally and rotationally relative to the first and second base rails 102L, 102R. For example, the second registration features may include step features 422S that register with like step features of the first rail 102L and second rail 102R, such as shown in FIG. 4C. Step features may register with the sides of the first portion 102A (e.g., upper portion shown in FIG. 2A) of the base rails 102L, 102R.

As shown in FIG. 4B, the neutral assembly 114 may be positioned along the base rails 102L, 102R (longitudinally along their length) by exterior pins 422P received in component attachment holes 102H (FIG. 2A) formed in the first rail 102L and second rail 102R. The neutral assembly 114 may be secured to the first and second rails 102L, 102R by fasteners received through holes 416H, for example. The neutral cross bus 118 may be received over the pins 420P and rest on top of risers 416R. The neutral assembly 114 may include neutral uprights 119A, 119B that may be secured on one end to the neutral cross bus 118 by fasteners threaded into the risers 416R. Neutral uprights 119A, 119B of the neutral assembly 114 may be fastened to a support strap 121 on the other end by fasteners (e.g., self-tapping screws). Support straps 121A, 121B may be secured to an adjacent breaker mounting barrier 113 or 115 by fasteners (e.g., screws).

In one or more embodiments, the neutral cross bus 118 may be positioned on the neutral barrier 116 such that the neutral barrier 116 does not extend past the cover supports 103 (see also FIG. 1). In FIG. 4E, the first bus support 104 is positioned over the neutral barrier 116 and neutral cross bus 118 and secured to the base rails 102L, 102R by fasteners 423 passing through hole 416H (FIGS. 4A-4B) in neutral barrier 116. The neutral cross bus 118 is isolated between the neutral barrier 116 and the first bus support 104.

Coupled to the respective ends of the neutral cross bus 118 of the neutral assembly 114 are neutral bar uprights 419A, 419B. Neutral bars 421A, 421B, including neutral sockets configured to receive neutral conductors, are mounted to the neutral bar uprights 419A, 419B and extend along their length.

In some embodiments, such as the embodiment shown in the build of FIG. 4D, the first bus support 104 is positioned on top of the neutral assembly 114 and is secured to the first rail 102L and the second rail 102R by fasteners 423 (e.g., screws, snap fit features, or the like). Each end of the neutral barrier 116 is sandwiched between a base rail 102L, 102R and an end of the first bus support 104. Fasteners 423 pass through the first and second sides 416A, 416B of the neutral barrier 116 and secure the neutral barrier 416 to the first and second rails 102L, 102R. A portion of the first bus support 104 overlying the neutral cross bar 418 and the neutral barrier 116 underlying the neutral cross bus 118, and the first registration features 420 functions to secure the neutral cross bus 118 in place and insulate it from the buses 108A-108C (or buses 508A-508C) to be added above.

FIG. 4F illustrates the buses 108A-108C installed on the first and second bus supports 104, 106. As stated, the buses 108A-108C may be registered longitudinally to first and second bus supports 104, 106 (and thus along the length of the base rails 102L, 102R) by component attachment holes 511 (FIG. 2A) registering on longitudinal locating pilots 306P (See FIGS. 3A and 5C).

Figure 7:
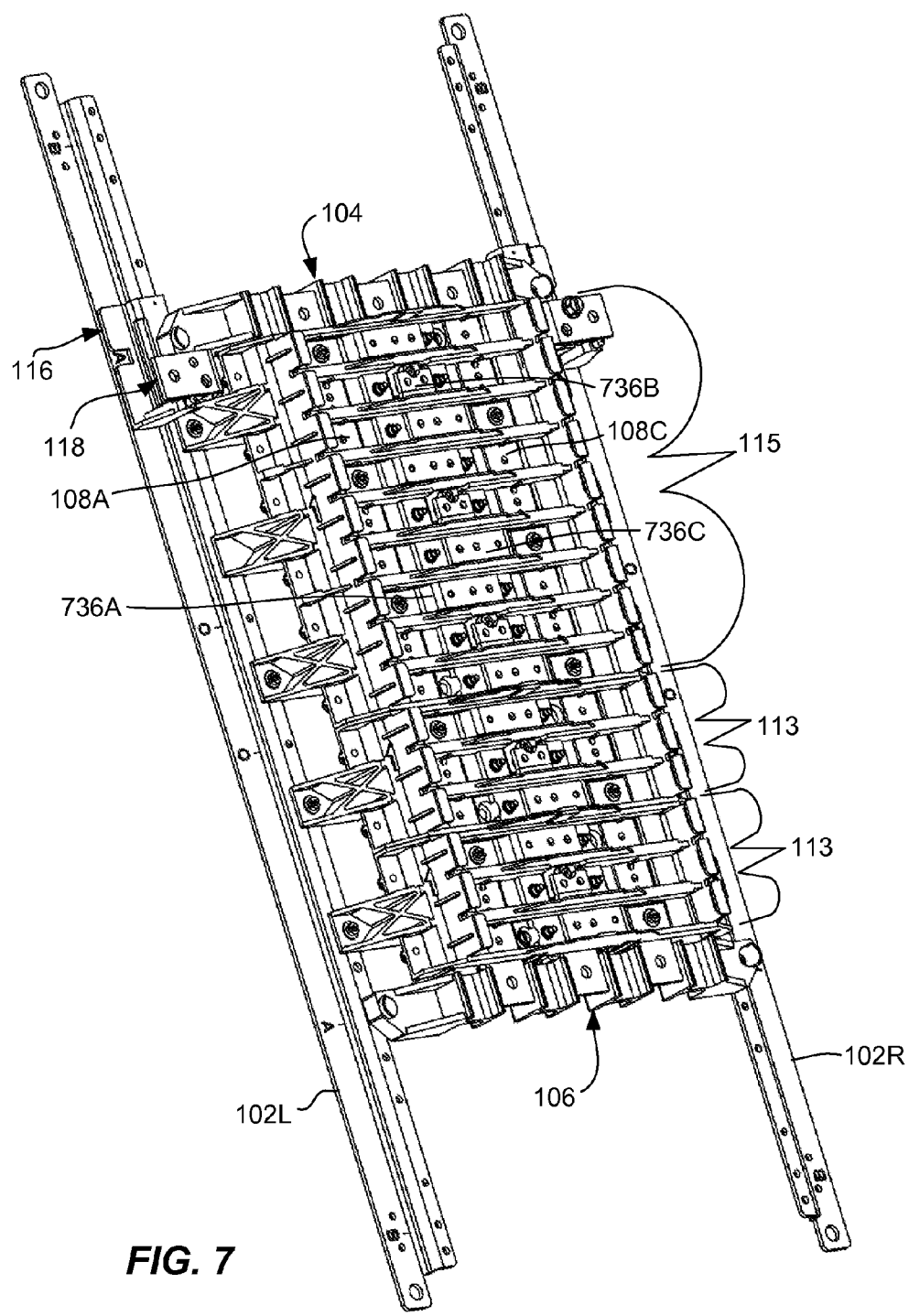
FIG. 7 illustrates a front isometric view of a panelboard according to one or more embodiments.

FIG. 7 illustrates a next stage of the assembly method adapted to assemble the panelboard assembly 100 wherein one or more breaker mounting barriers 113, 115 are mounted to the top of the base rails 102L, 102R overtop of the buses 108A-108C (or buses 508A-508C). In this embodiment, one wide breaker mounting barrier 115 and two narrow breaker mounting barriers 113 are used to provide thirty breaker mounting locations. Other combinations of wide breaker mounting barriers 115 and narrow breaker mounting barriers 113 may be used, as is described in Table 1 above. The conductive spacers 736A-736C shown in FIGS. 7 and 8 are configured for making the electrical connection between the exposed portions of the buses 108A, 108B, 108C and the conductor tabs on the circuit breakers (not shown in FIGS. 7 and 8). The conductive spacers 736A and 736C couple to the buses 108A, 108C, respectively, and bring the connection to the center of the panelboard assembly 100, such that the connection locations are longitudinally aligned with the connection to spacer 736B.

Figure 8A:
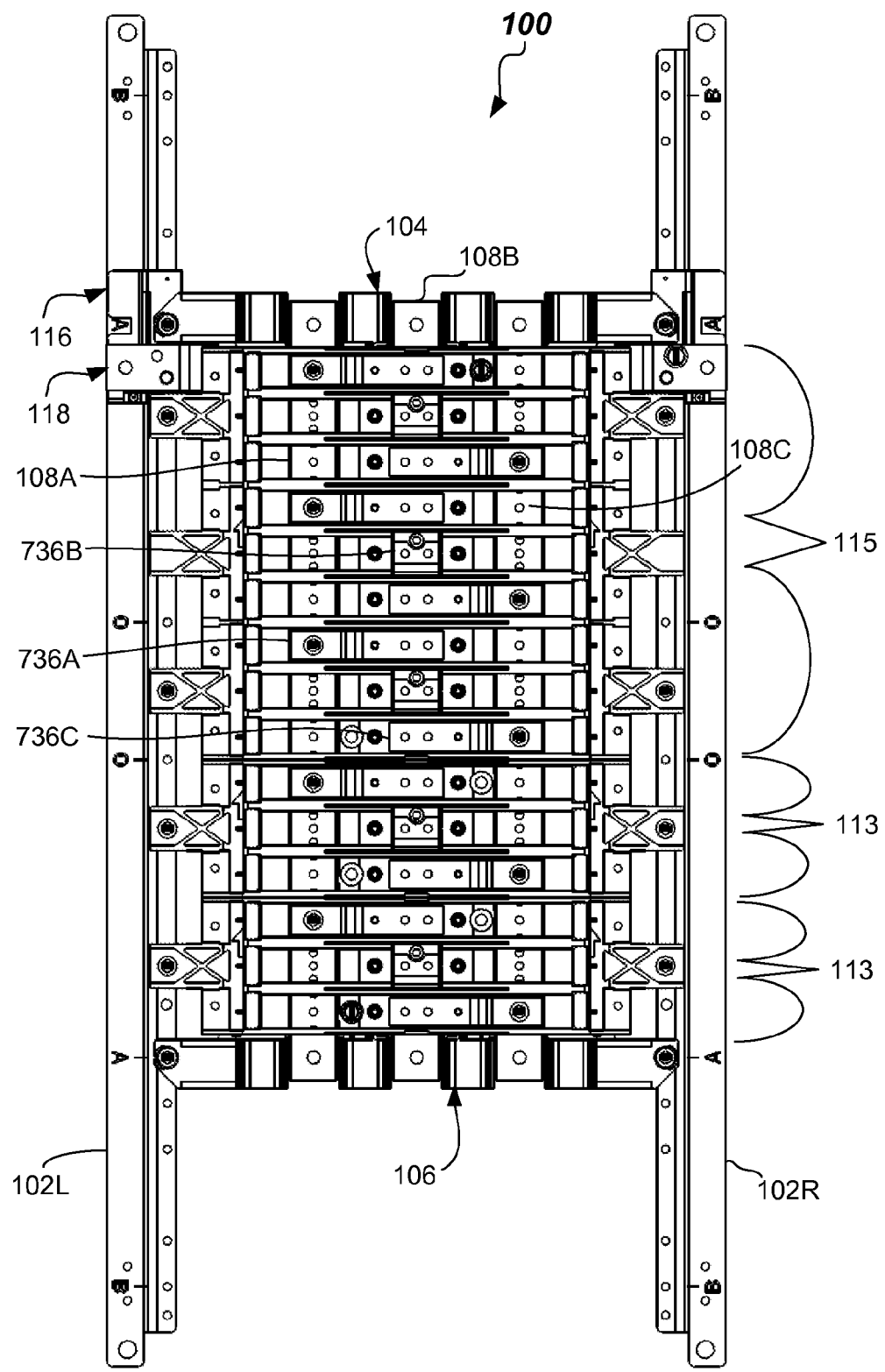
FIG. 8A illustrates a front plan view of a panelboard assembly including spacers configured to accept circuit breakers according to one or more embodiments.

FIG. 8A illustrates an embodiment of the panelboard assembly 100 with the conductive spacers 736A-736C connected to the buses 108A, 108B, 108C. The conductive spacers 736A-736C are conductive (e.g., copper) and are configured for making the electrical connection between the buses 108A, 108B, 108C and the conductor tabs on the circuit breakers (not shown). The conductive spacers 736A, 736B, 736C provide an electrical connection from the location of the respective buses 108A, 108B, 108C (or buses 508A-508C) to a location central on the panelboard assembly 100 where the circuit breakers (not shown) may be electrically connected on their respective line sides.

Figure 8B:
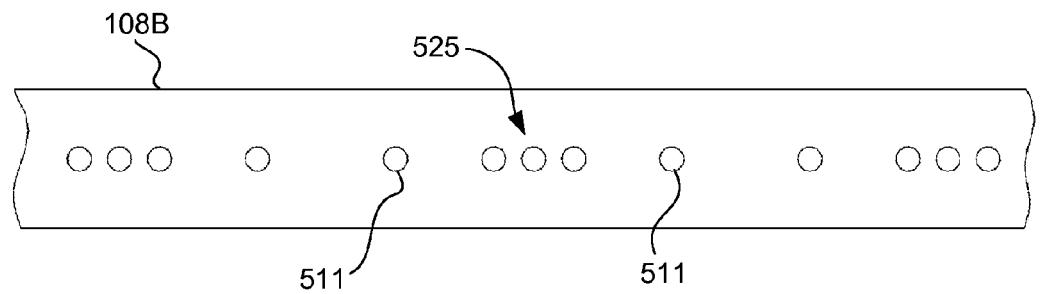
FIG. 8B illustrates a front plan view of a hole pattern in a bus according to one or more embodiments.

As shown in FIG. 8A, a panelboard assembly 100 is shown wherein the conductive spacers 736A, 736B, 736C are shown mounted thereon. A representative hole pattern on the B-phase bus 108B is shown in FIG. 8B. The other buses 108A, 108C being common may have the same hole pattern thereon. The pattern may include a three-hole pattern 525 including three holes being spaced a distance of about 76 mm apart, for example. Other spacing may be used. The hole pattern reoccurs on the bus 108B every about 3 inches (76 mm) for a 1 inch (25.4 mm) standard breaker spacing along the length of the panelboard assembly 100, for example. Other recurrent spacing may be used. The apertures 511 to the right and left of the three hole pattern 525 are used to connect the A-phase and C-phase buses 108A, 108C to the A-phase and C-phase conductive spacers 736A, 736C as shown in FIG. 8A.

Figure 8C:
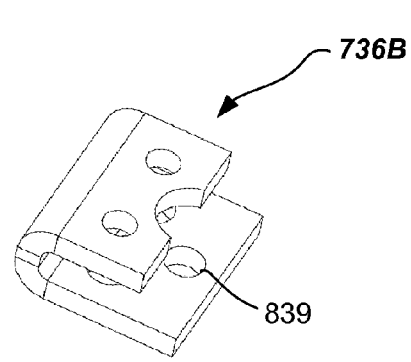
FIGS. 8C and 8D illustrate front and rear isometric views of a spacer according to one or more embodiments.
Figure 8D:
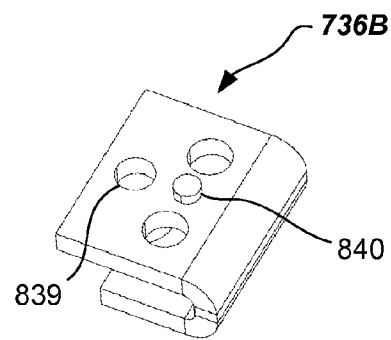
Figure 8E:
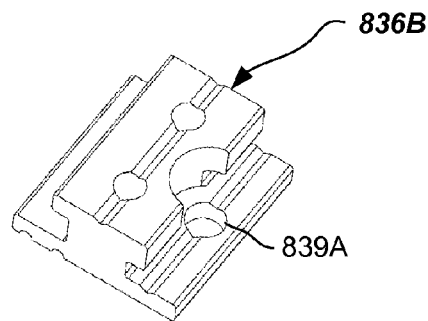
FIGS. 8E and 8F illustrate front and rear isometric views of another spacer according to one or more embodiments.
Figure 8F:
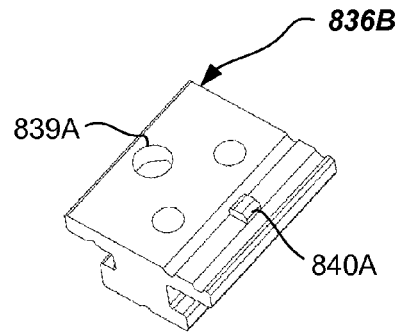
Figure 8G:
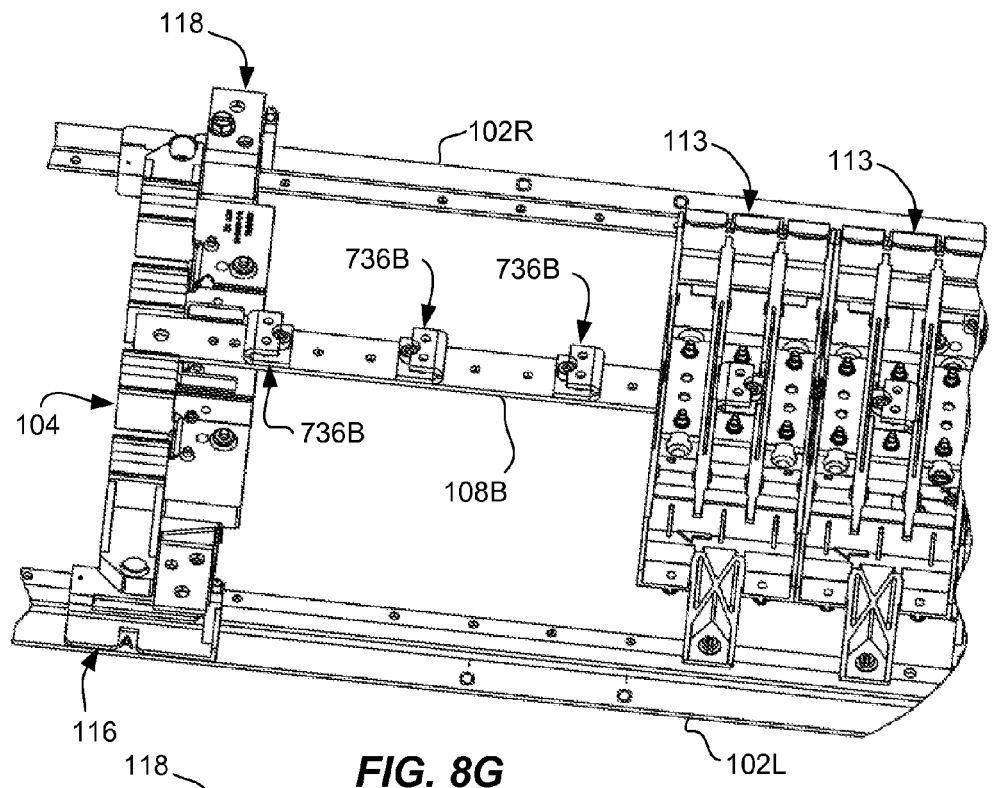
FIGS. 8G and 8H illustrate front isometric views of spacers coupled to the bus bars according to one or more embodiments.
Figure 8H:
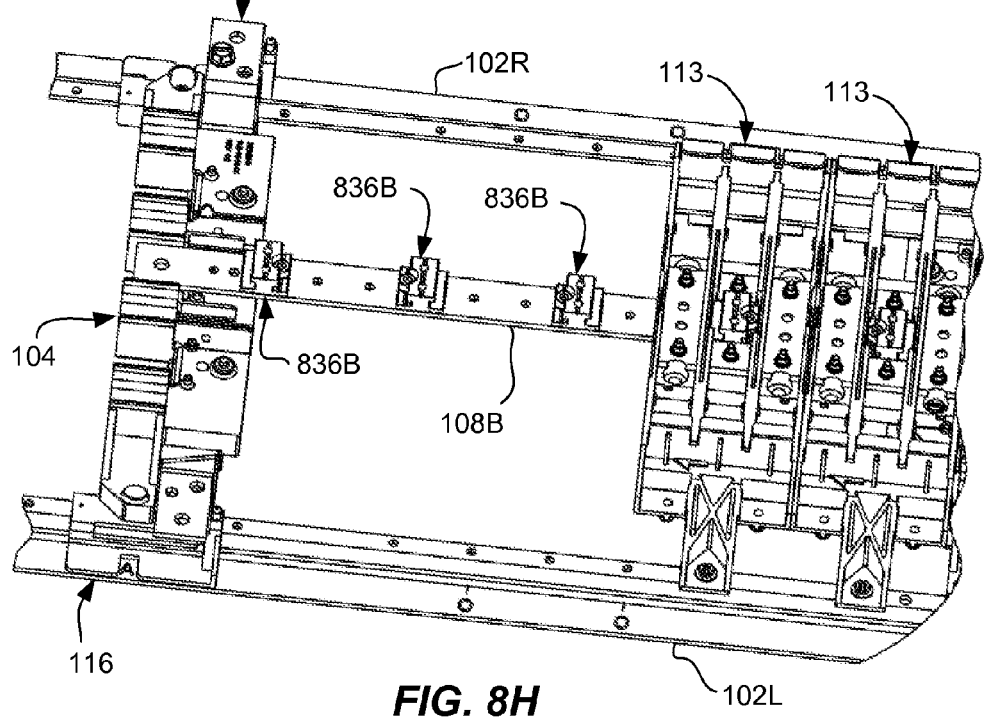

Shown in FIGS. 8C and 8D is a first embodiment of a conductive spacer 736B that is used for the connection to the B-phase bus 108B. This conductive spacer 736B may be made of copper and may be bent into a J-shape, as shown. The underside (shown in FIG. 8D) may include a mounting hole 839 and a locating protrusion 840. As shown in FIG. 8G, which has the wide mounting barrier 115 and the A-Phase and C-Phase buses 108A, 108C removed for illustration purposes, the conductive spacer 736B may be mounted to the bus 108B in one of two configurations. The conductive spacer 736B may be mounted to the bus 108B by securing a self-tapping screw through the mounting hole 839 while the locating protrusion 840 is received in one of the other holes in the three-hole pattern 525. This prevents rotation of the conductive spacer 736B on the bus 108B. If for example, if the aperture of the three-hole pattern 525 were to become stripped for some reason, the conductive spacer 736B may be rotated 180 degrees and the screw reinserted in a non-stripped aperture as is shown with the left most conductive spacer 736B shown in FIG. 8G. Typically, the conductive spacer 736B may be installed after the breaker mounting barriers 113, 115 are installed. A similar design for an aluminum conductive spacer 836B including mounting hole 839A and locating protrusion 840A is shown in FIGS. 8E and 8F. This conductive spacer 836B may also be reversed in orientation as is shown in FIG. 8H.

FIG. 9 illustrates a panelboard assembly 900 that is ready to install into an enclosure 1150, for example, by securing the rails 102L, 102R to the enclosure 1150 as shown in FIG. 11.

Figure 12:
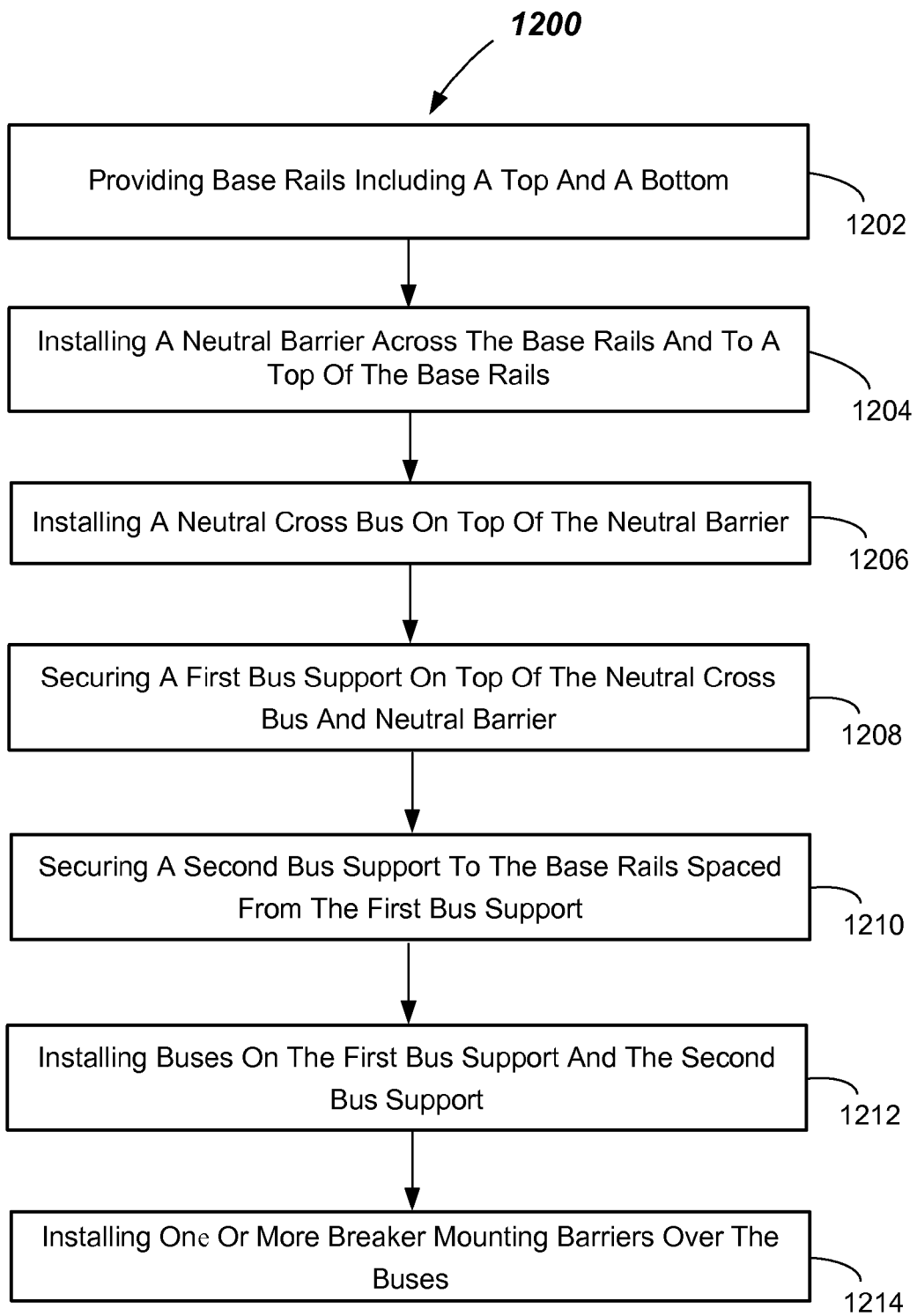
FIG. 12 is a flowchart of a method of assembling a panelboard according to embodiments.

A method of assembling a panelboard 100 will now be described with reference to FIG. 12. The method 1200 includes, in 1202, providing base rails including a top and a bottom, and, in 1204, installing a neutral barrier across the base rails and to a top of the base rails. Assembly method 1200 further includes, in 1206, installing a neutral cross bus on top of the neutral barrier, and, in 1208, securing a first bus support on top of the neutral cross bus and neutral barrier. Assembly method 1200 further includes, in 1210, securing a second bus support to the base rails spaced from the first bus support, and, in 1212, installing buses on the first bus support and the second bus support. Assembly method 1200 further includes, in 1214, installing one or more breaker mounting barriers over the buses.

It should be readily appreciated by those persons of ordinary skill in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular apparatus, assemblies, systems and/or methods disclosed, but, to the contrary, the intention is to cover all modifications, equivalents, and alternatives falling within the scope of the claims.

What is claimed is:

1. A panelboard assembly, comprising:
   base rails;
   a first bus support extending between the base rails;
   one or more buses coupled to the first bus support; and
   one or more breaker mounting barriers received over top of the one or more buses
   wherein the panelboard assembly accommodates one or more buses having different widths and/or thicknesses, wherein the first bus support comprises pins extending from a top surface and configured to contact an underside of a thin bus design and to be received adjacent to lateral sides of a thick bus design.

2. The panelboard assembly of claim 1, wherein the first bus support accommodates one or more buses of different thicknesses.

3. The panelboard assembly of claim 1, wherein the one or more breaker mounting barriers accommodates one or more buses of different widths.

4. The panelboard assembly of claim 1, wherein the one or more breaker mounting barriers are coupled to the base rails.

5. The panelboard assembly of claim 1, wherein the first bus support is coupled on a top of the base rails.

6. The panelboard assembly of claim 1, comprising a second bus support coupled across the base rails, wherein the second bus support accommodates different thickness buses, and wherein the one or more buses extend between, and couple to, the first bus support and the second bus support.

7. The panelboard assembly of claim 1, comprising a neutral cross bar assembly:
   a neutral barrier coupled across and to a top of the base rails; and
   cover supports coupled to the base rails; and
   a neutral cross bus positioned on the neutral barrier wherein the neutral barrier does not extend past the cover supports.

8. The panelboard assembly of claim 7, wherein each end of the neutral barrier is sandwiched between a base rail and an end of the first bus support.

9. The panelboard assembly of claim 1, wherein the thick bus design comprises side recesses configured to receive the pins.

10. The panelboard assembly of claim 1, wherein the breaker mounting barrier comprises bracing members configured to interface with bracing features on the one or more buses.

11. The panelboard assembly of claim 1, wherein the base rails comprise a common cross-sectional shape along a length between where the first bus support and a second bus support are positioned on the base rails.

12. The panelboard assembly of claim 1, wherein the buses comprise an A-phase bus, a B-phase bus, and a C-phase bus and wherein the buses are identical to one another.

13. The panelboard assembly of claim 12, wherein the A-phase bus, a B-phase bus, and a C-phase bus are planar along their length.

14. A panelboard assembly, comprising:
   base rails;
   a first bus support extending between the base rails;
   one or more buses coupled to the first bus support; and
   one or more breaker mounting barriers received over top of the one or more buses
   wherein the panelboard assembly accommodates one or more buses having different widths and/or thicknesses, wherein the first bus support is configured to provide a common location of an upper bus surface for both a thin bus design and a thick bus design.

15. A panelboard assembly, comprising:
base rails;
a first bus support extending between the base rails;
one or more buses coupled to the first bus support; and
one or more breaker mounting barriers received over top of the one or more buses
wherein the panelboard assembly accommodates one or more buses having different widths and/or thicknesses, wherein the one or more breaker mounting barriers comprises a combination of one or more narrow width breaker mounting barrier and one or more wide width breaker mounting barrier.

16. A panelboard assembly, comprising:
base rails;
a first bus support extending between the base rails;
one or more buses coupled to the first bus support; and
one or more breaker mounting barriers received over top of the one or more buses
wherein the panelboard assembly accommodates one or more buses having different widths and/or thicknesses, wherein at least some of the buses include a three-hole pattern, and a spacer is coupled to the bus using one of the holes in the three-hole pattern for anti-rotation and another of the holes in the three-hole pattern for mounting the spacer to the bus.

* * * * *